US009036682B2

(12) United States Patent
Keegan et al.

(10) Patent No.: US 9,036,682 B2
(45) Date of Patent: May 19, 2015

(54) PHASE MULTI-PATH MITIGATION

(71) Applicant: Deere & Company, Moline, IL (US)

(72) Inventors: Richard G. Keegan, Palos Verdes Estates, CA (US); Ronald R. Hatch, Willington, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/199,923

(22) Filed: Mar. 6, 2014

(65) Prior Publication Data
US 2014/0376598 A1 Dec. 25, 2014

Related U.S. Application Data

(60) Provisional application No. 61/819,296, filed on May 3, 2013.

(51) Int. Cl.
*H04B 1/69* (2011.01)
*H04B 1/707* (2011.01)
*H04B 1/713* (2011.01)
*H04B 1/711* (2011.01)
*G01S 19/22* (2010.01)
*G01S 19/30* (2010.01)
*H04B 1/7077* (2011.01)

(52) U.S. Cl.
CPC ............... *H04B 1/711* (2013.01); *G01S 19/22* (2013.01); *G01S 19/30* (2013.01); *H04B 1/7077* (2013.01); *H04B 2001/70706* (2013.01)

(58) Field of Classification Search
CPC ............... H04B 1/711; H04B 1/7077; H04B 2001/70706; H04B 1/712; H04B 1/7097; G01S 19/22; G01S 19/30
USPC ......... 375/144, 145, 148, 149, 150, 142, 346, 375/349; 455/504, 506, 501
See application file for complete search history.

(56) References Cited

U.S. PATENT DOCUMENTS

| 6,160,841 | A  | * | 12/2000 | Stansell et al. | 375/148 |
| 6,347,113 | B1 | * | 2/2002  | Hatch          | 375/149 |
| 6,603,803 | B1 | * | 8/2003  | Hatch          | 375/150 |
| 6,744,404 | B1 | * | 6/2004  | Whitehead et al.| 342/357.61 |
| 7,453,925 | B2 |   | 11/2008 | Keegan et al.  |         |
| 2006/0083293 | A1 | * | 4/2006 | Keegan et al.  | 375/148 |
| 2012/0293365 | A1 |   | 11/2012| Ashjaee et al. |         |

OTHER PUBLICATIONS

Deere & Company, International Search Report and Written Opinion, PCT/US2014/036127, Sep. 25, 2014, 11 pgs.

* cited by examiner

*Primary Examiner* — Phuong Phu
(74) *Attorney, Agent, or Firm* — Morgan, Lewis & Bockius LLP

(57) ABSTRACT

A method for mitigating a multi-path-induced error in a global navigation satellite system comprises, for a respective measurement epoch, obtaining respective representations of a composite signal including a plurality of value-pairs of the composite signal. The method further comprises, with respect to the measurement epoch: obtaining a plurality of coefficients for a set of linear equations based on the plurality of value-pairs of the composite signal; iteratively obtaining solutions for the set of linear equations, thereby solving for a code tracking timing offset, a time delay of a multi-path signal of the composite signal relative to its direct-path signal, and orthogonal representations of the multi-path signal; determining a phase error between the composite signal and the direct-path signal, due to the time delay, in accordance with the orthogonal representations of the multi-path signal; and correcting for the code tracking timing offset and the phase error.

23 Claims, 23 Drawing Sheets

PHASE MULTI-PATH MITIGATION

RELATED APPLICATIONS

This application claims priority to U.S. Provisional Patent Application No. 61/819,296, filed May 3, 2013, which is hereby incorporated by reference in its entirety.

FIELD OF THE INVENTION

The present invention relates generally to a global navigation satellite system (GNSS) and more specifically, to a system and method for mitigating a multi-path-induced error in a global navigation satellite system (GNSS).

BACKGROUND OF THE INVENTION

Receivers in global navigation satellite systems (GNSS), such as the Global Positioning System (GPS), use range measurements that are based on line-of-sight signals from satellites. The receiver measures the time-of-arrival of one or more broadcast signals. This time-of-arrival measurement includes a time measurement based upon a coarse acquisition coded portion of a signal, called pseudo-range, and a phase measurement based on an L-band carrier signal, including L1 at 1.57542 GHz, L2 at 1.22760 GHz and L5 at 1.17645 GHz. Ideally, these measurements are based only on the direct line-of-sight signals. The actual signals received by the receiver, however, are a composite of the direct line-of-sight signals and one or more secondary reflected signals. These secondary signals, known as multi-path signals, are reflected by any number of structures, including buildings, equipment and the ground.

The path-length of the multi-path signal is longer than that of the direct-path signal resulting in the multi-path signal arriving at the signal receiver at a time instant later than a time of arrival of the direct path signal. As a result, a composite signal is received at the signal receiver which comprises the direct path signal and the delayed multi-path version of the direct path signal. The time delay in arrival of the multi-path signal with respect to the direct path signal results in an undesired detectable phase distortion in the composite signal.

SUMMARY OF THE INVENTION

In order to mitigate such a multi-path-induced error in global navigation satellite systems (GNSS), there is a need to correct for the phase distortion in the composite signal received at the signal receiver.

Conventional methods for correcting phase multi-path errors in GNSS systems use numerical approaches that involve multiple iterations to converge to an estimate of the multi-path induced phase error. However, these approaches use numerical techniques that are computationally expensive and cumbersome to implement on a GNSS receiver.

The disclosed method for mitigating a multi-path-induced error in a global navigation satellite system (GNSS) requires a simpler computational procedure to rapidly arrive at an initial solution for the code tracking offset and the multi-path induced delay. Furthermore, after an initial solution is reached, the method uses computationally inexpensive numerical techniques in order to rapidly converge to an accurate estimate for the multi-path induced phase error.

In some embodiments, a method of mitigating the effect of a multi-path-induced error in a global navigation satellite system (GNSS), comprises: for a respective measurement epoch, obtaining respective representations of a composite signal including a plurality of value-pairs of the composite signal obtained during a corresponding plurality of time instances of one or more transient state portions of the composite signal. The composite signal includes a band-limited direct-path signal and at least one band-limited multi-path signal. The method further comprises with respect to the measurement epoch: obtaining a plurality of coefficients for a set of linear equations based on the plurality of value-pairs of the composite signal; iteratively obtaining solutions for the set of linear equations, thereby solving for a code tracking timing offset ($\tau_1$), a time delay ($\tau_2$) of the multi-path signal relative to the direct-path signal, and orthogonal representations of the multi-path signal; determining a phase error $\phi_\epsilon$ between the composite signal and the direct-path signal, due to the time delay ($\tau_2$) in the multi-path signal relative to the direct-path signal, in accordance with a trigonometric function defined with respect to the orthogonal representations of the multi-path signal; and correcting for the code tracking timing offset ($\tau_1$) and the phase error $\phi_\epsilon$.

BRIEF DESCRIPTION OF THE DRAWINGS

Like reference numerals refer to corresponding parts throughout the several views of the drawings.

DETAILED DESCRIPTION OF THE DRAWINGS

Figure 1:
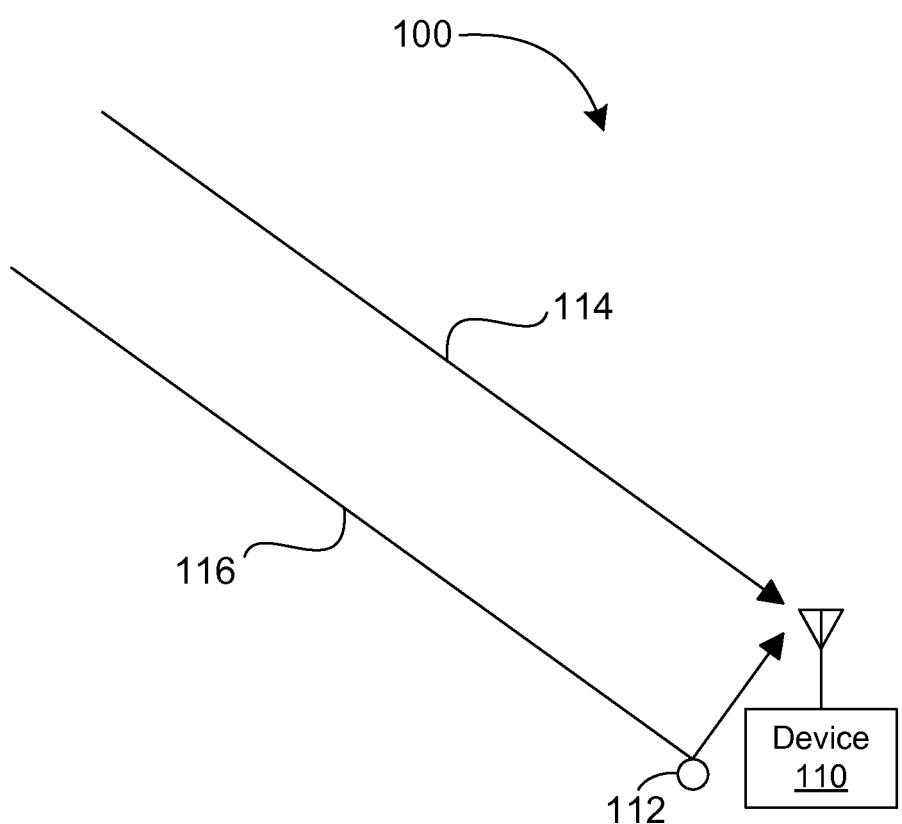
FIG. 1 is a diagram illustrating multi-path effect in signal propagation, including a direct-path signal and a multi-path signal arriving at a device in a global navigation satellite system (GNSS).

FIG. 1 illustrates a composite signal in a global navigation satellite system (GNSS) 100. A device 110 receives a direct-path signal 114 and a single multi-path signal 116 reflected off of object 112. The path-length of the multi-path signal 116 is longer than that of the direct-path signal 114. As a consequence, the multi-path signal 116 is a slightly delayed replica of the direct-path signal 114 with typically a lower amplitude.

Figure 2:
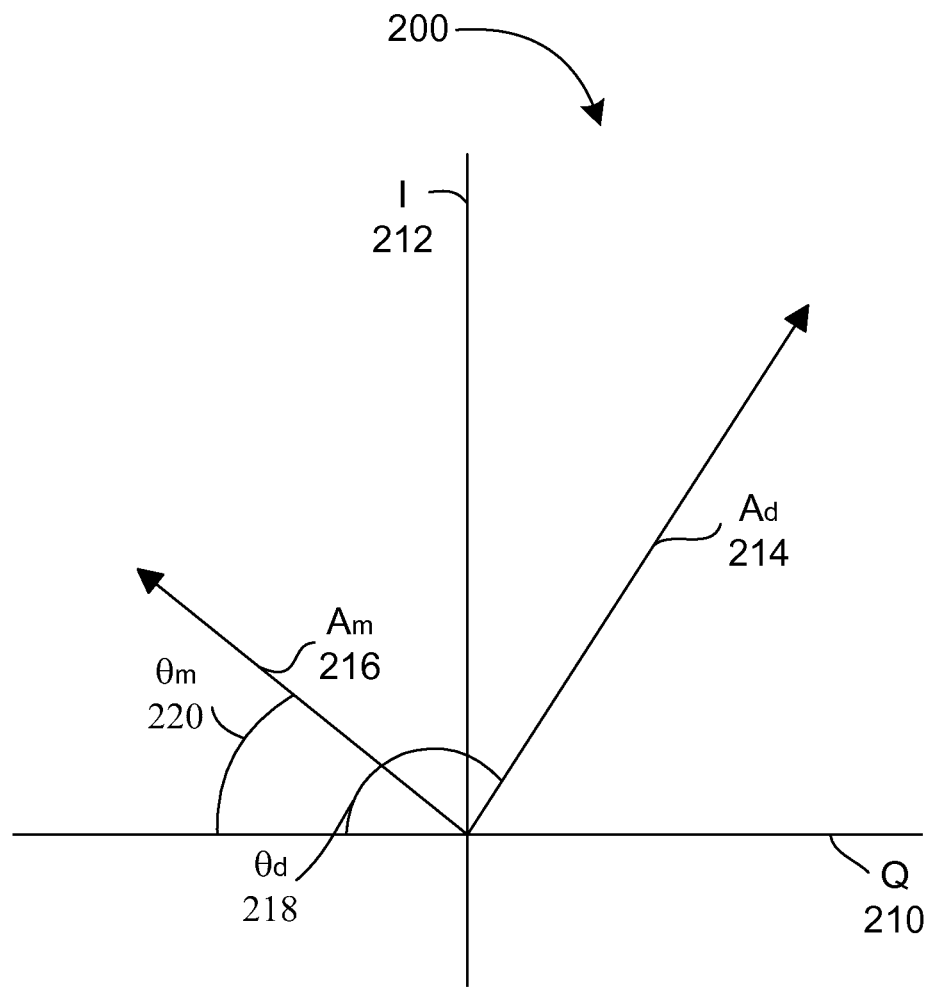
FIG. 2 illustrates a phasor diagram of the in-phase and quadrature components of the direct-path signal and the multi-path signal.

FIG. 2 illustrates a phasor diagram 200 of the signals received by the device 110 (FIG. 1) including in-phase I 212 and quadrature Q 210 components (relative to an internal reference in the device 110 in FIG. 1). The quadrature Q 210 component has a 90° phase relationship with the in-phase I 212 component. The direct-path signal 114 (FIG. 1) has amplitude $A_d$ 214 and a phase $\theta_d$ 218. The multi-path signal 116 (FIG. 1) has amplitude $A_m$ 216 and phase $\theta_m$ 220. Since the multi-path signal 116 (FIG. 1) arrives at a different time than the direct-path signal 114 (FIG. 1), phases $\theta_d$ 218 and $\theta_m$ 220 are different. Multi-path signals, such as the multi-path signal 116 (FIG. 1), give rise to a distortion in the L-band carrier signal also known as phase multi-path.

Figure 3:
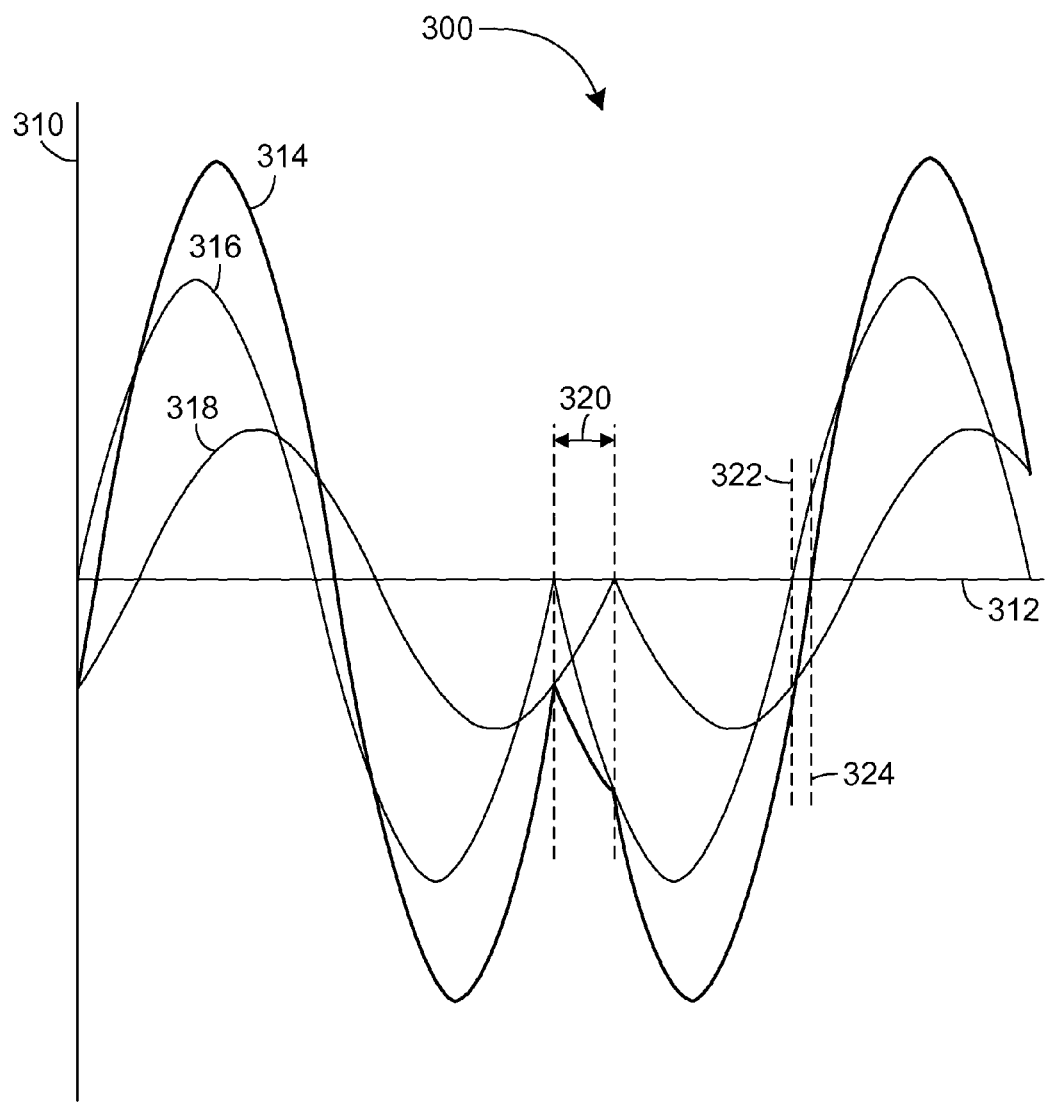
FIG. 3 is a prophetic diagram that illustrates phase multi-path distortion of a composite signal.

FIG. 3 is a prophetic diagram that illustrates magnitude 310 as a function of time 312 for signals in phase multi-path distortion 300. A composite signal 314 received by the device 110 (FIG. 1) is the sum of a sinusoidal direct-path signal 316 and typically a lower-amplitude, delayed multi-path signal 318. The direct-path signal 316 and the multi-path signal 318 are encoded such that each undergoes a 180° phase reversal at a code chip edge. Note that the phase reversal is also known as a code transition. The code transition rate (also known as the code chip edge rate) is a sub-multiple of the L-Band Carrier Frequency. For example, in GPS the sub-multiple is 154 and 120 for the P-code on L1 and L2, respectively. The code chip rate is 1.023 MHz for the coarse acquisition code (or CA code). In many global navigation satellite systems (GNSS) signals are encoded with code transitions using a bi-phase modulation code where a carrier signal phase is advanced or retarded by 90°. The different phase of the multi-path signal 318 results in noticeable distortion in the composite signal 314 during time interval 320. There are, however, effects at other times, too. For example, in this illustration a zero crossing 324 of the composite signal 314 is delayed, i.e., shifted to the right, relative to a zero crossing 322 of the direct-path signal 316. In general, multi-path signals may result in zero crossings of the composite signal 314 that are delayed or advanced. This apparent phase advance or delay gives rise to a phase error.

In FIG. 3, the composite signal 314 has a distorted but predictable shape during the time interval 320, between the code chip edge for the direct-path signal 316 and the code chip edge for the multi-path signal 318. The observable characteristics of the received composite signal 314 during the time interval 320 are used in a system and method to determine and mitigate one or more multi-path-induced errors. More specifically, the pattern of the composite carrier signal 314 during the time interval 320 (e.g., during a transient state portion of the composite signal during which the composite signal undergoes phase reversal) is observable by the device 110 (FIG. 1). Since the multi-path signal 318 is delayed with respect to the direct-path signal 316, code transitions of the carrier signal corresponding to the code chip edge occur at a later time in the multi-path signal 318.

GPS is used to illustrate the system and method. The system and method are, however, not limited to GPS. They may be used in other global navigation satellite systems (GNSS) including but not limited to the Global Orbiting Navigation Satellite System (GLONASS), the GALILEO positioning system, the European Geostationary Navigation Overlay System (EGNOS), the Wide Area Augmentation System (WAAS), the Multifunctional Transport Satellite-Based Augmentation System (MSAS) and a Quasi-Zenith Satellite System (QZSS).

In GPS, the L-band carrier signal is encoded using a spread-spectrum pseudo-random-noise code with a bi-phase modulation. The basic signal processing performed by the device 110 (FIG. 1) on the composite signal 314 is a tracking loop process that matches a phase of a replica signal created by the device 110 (FIG. 1) with a phase of the composite signal 314 received from at least one satellite. The synchronization used to create the replica signal provides the basic code pseudo-range measurement and the carrier phase measurement made by the device 110 (FIG. 1). The tracking process of the device 110 (FIG. 1) cannot easily distinguish between the direct-path signal 316 and the multi-path signal 318, so it tracks the composite signal 314.

Figure 4A:
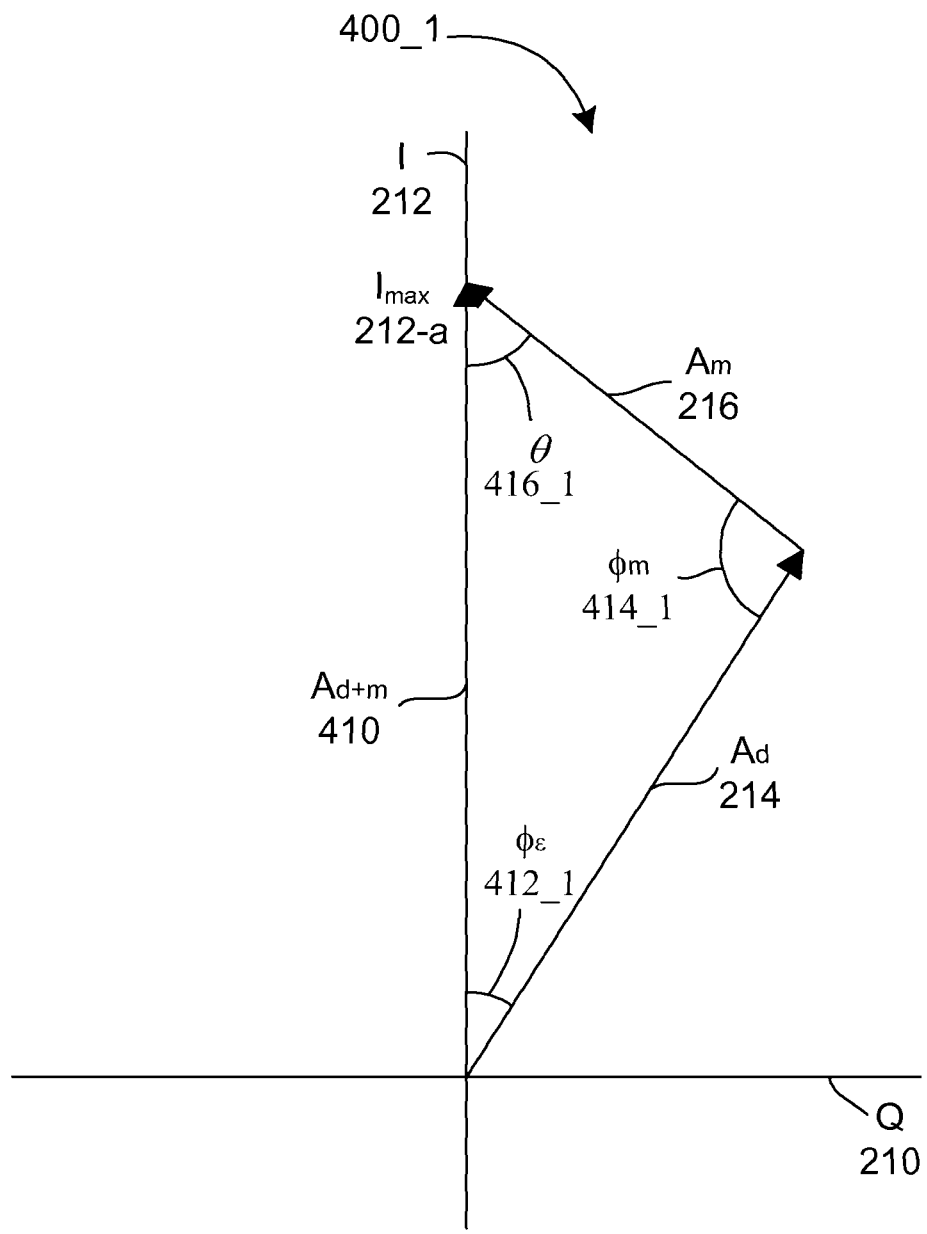
FIG. 4A illustrates a tracked vector corresponding to a composite signal, during a steady state period (e.g., prior to a period of phase reversal) of the composite signal.

FIG. 4A is an illustration of the tracking loop process 400_1. FIG. 4A corresponds to times prior to the time interval 320 (FIG. 3), for example, during a steady state period of the composite signal prior to a phase reversal in either the direct path or the multi-path signal. As shown in FIG. 4A the composite signal amplitude $A_{d+m}$ 410, is the vector sum of the direct-path signal amplitude 214 and the multi-path signal amplitude 216. In some embodiments, during the steady state portion (e.g., prior to the phase reversal of the composite signal), the composite signal is aligned in phase relative to an internal reference in the device 110 (FIG. 1). Consequently, the in-phase component of the composite signal has a maximum amplitude ($I_{MAX}$) during the steady state portion. The composite signal amplitude $A_{d+m}$ 410, and thus the signal replica used in the phase measurement, has a phase error $\phi_\epsilon$ 412_1 relative to the direct-path signal amplitude 214. FIG. 4A also illustrates the phase difference $\phi_m$ 414_1 between the direct-path signal amplitude 214 and the multi-path signal amplitude 216 and the phase $\theta$ 416_1, which is equal to 180 degrees (or equivalently, $\pi$ radians) minus the sum of $\phi_\epsilon$ 412_1 and $\phi_m$ 414_1.

Figure 4B:
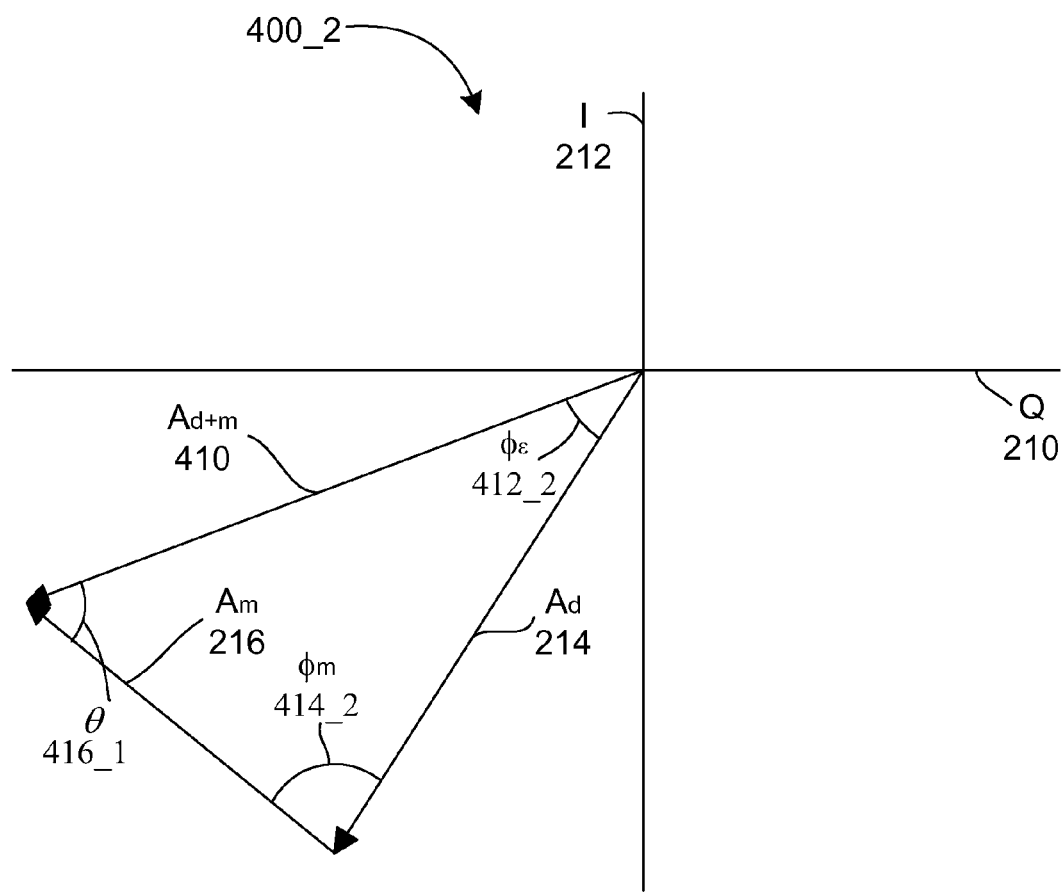
FIG. 4B illustrates a tracked vector corresponding to the composite signal, during a period of phase reversal of the composite signal.

FIG. 4B corresponds to times during the time interval 320 (FIG. 3), for example, during a transient state period of the composite signal corresponding to a phase reversal in the composite signal. Referring to FIG. 4B, due to a time delay $\tau_2$ of the multi-path signal 116 (FIG. 1) relative to the direct-path signal 114 (FIG. 1), a phase reversal occurs for the direct-path signal 316 (FIG. 3) at the device 110 (FIG. 1) before the multi-path signal 318 (FIG. 3). This gives rise to change in phase of the composite signal 314 (FIG. 3), and new values for a phase error $\phi_\epsilon$ 412_2 and a phase difference $\phi_m$ 414_2 in the tracking process 400_2.

Figure 4C:
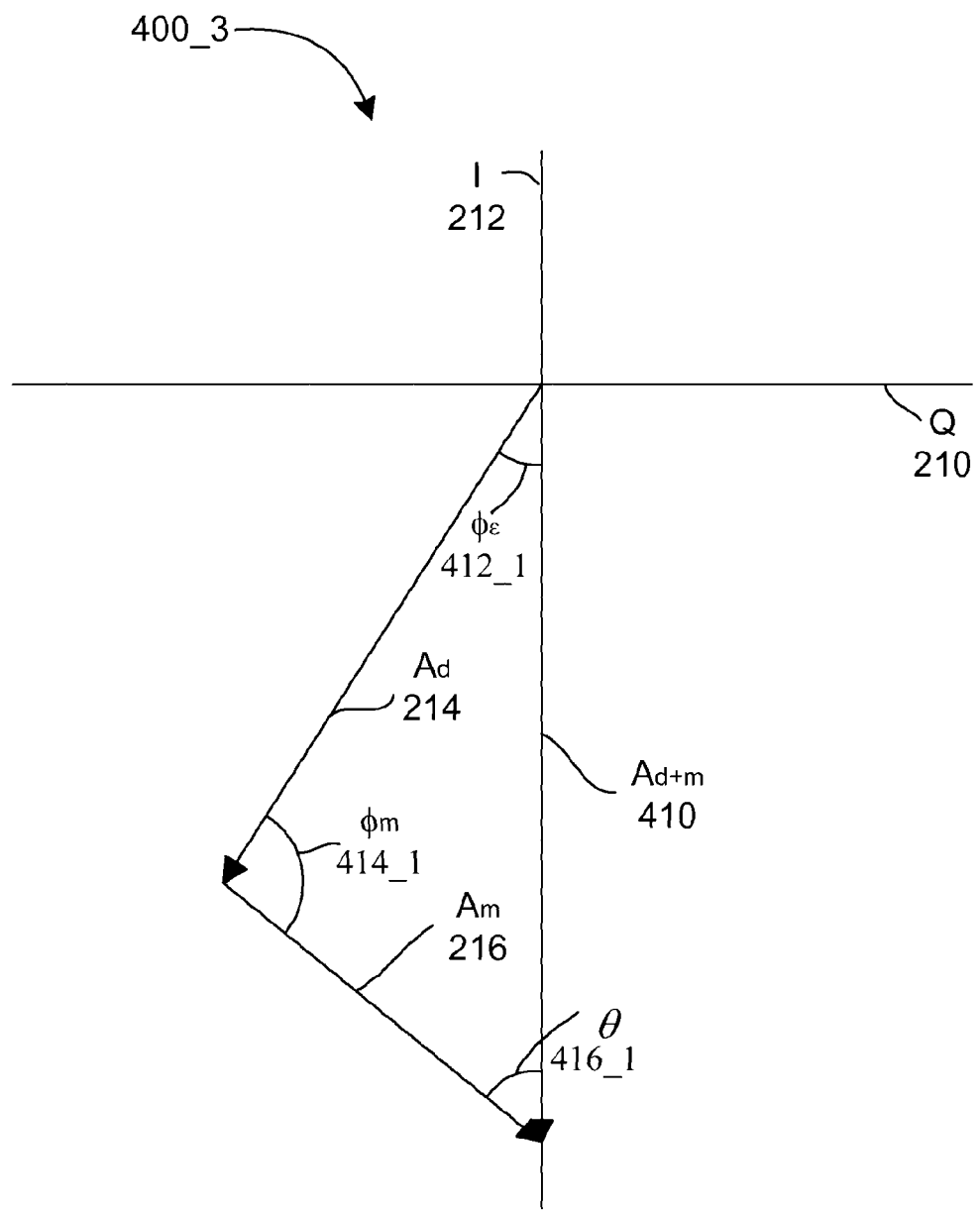
FIG. 4C illustrates a tracked vector corresponding to the composite signal, after the direct-path signal and the multi-path signal have undergone a phase reversal.

FIG. 4C corresponds to times after the time interval 320 (FIG. 3), after the transient state portion of the composite signal corresponding to a phase reversal in the composite signal. Referring to FIG. 4C, after the phase reversal occurs for the multi-path signal 318 (FIG. 3), there will be an original phase for the composite signal 314 (FIG. 3), and the phase error $\phi_\epsilon$ 412_1 and the phase difference $\phi_m$ 414_1 in the tracking process 400_3 will return to the values in the tracking process 400_1.

By measuring the phase of the composite signal 314 (FIG. 3) in FIG. 4B, after the code transition of the direct-path signal 316 (FIG. 3) but before the code transition of the multi-path signal 318 (FIG. 3), the phase error $\phi_\epsilon$ 412_1 in the tracking process 400_1 can be calculated.

Figure 4D:
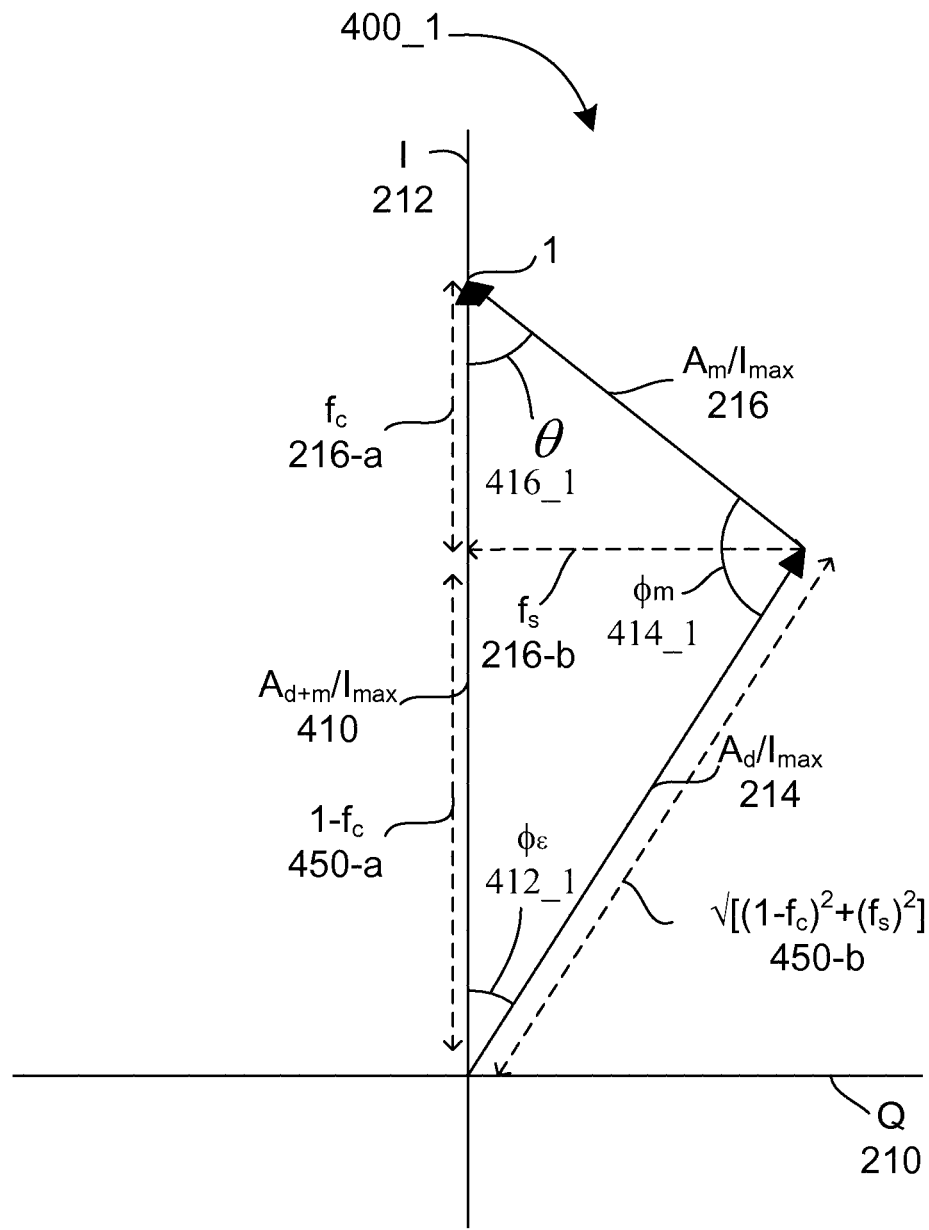
FIG. 4D illustrates a tracked vector, normalized to a steady state value of the composite signal, during a steady state phase (e.g., prior to a period of phase reversal) of the composite signal.
Figure 4E:
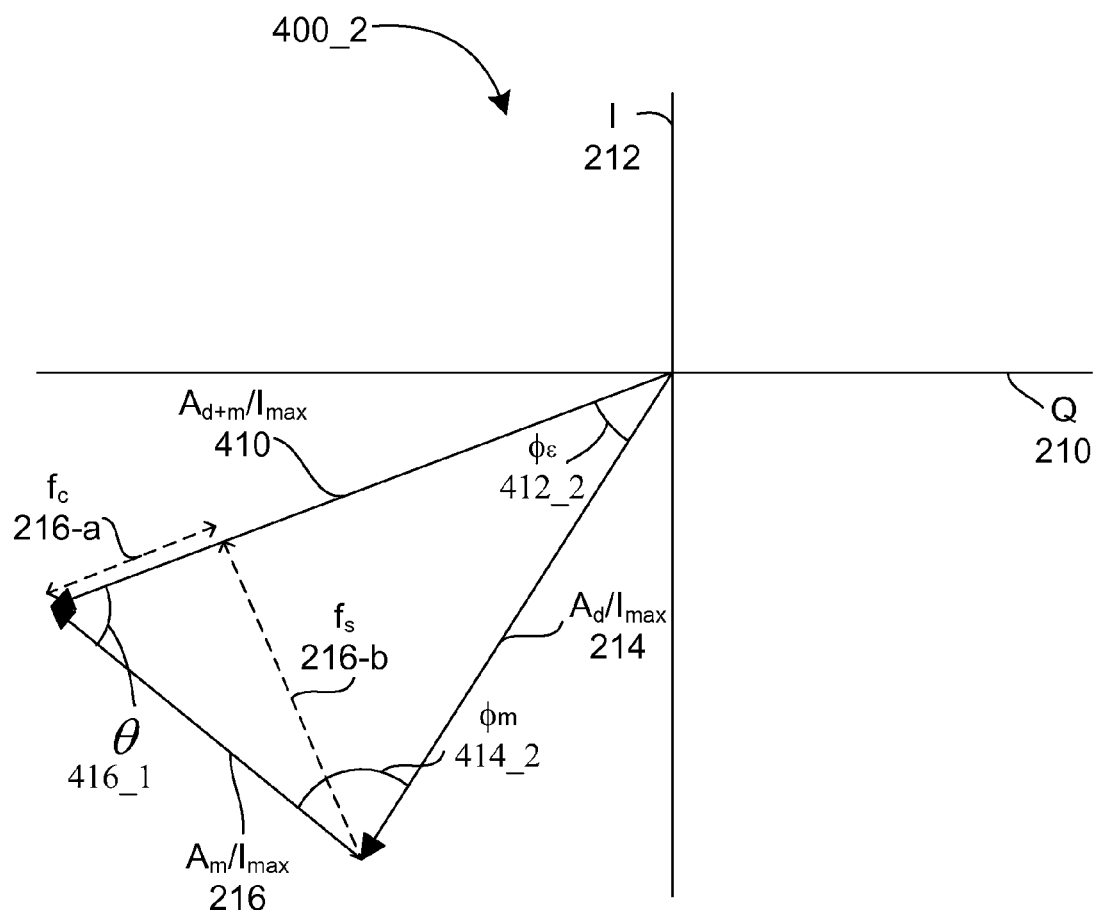
FIG. 4E illustrates a tracked vector, normalized to a steady state value of the composite signal, during a period of phase reversal of the composite signal.
Figure 4F:
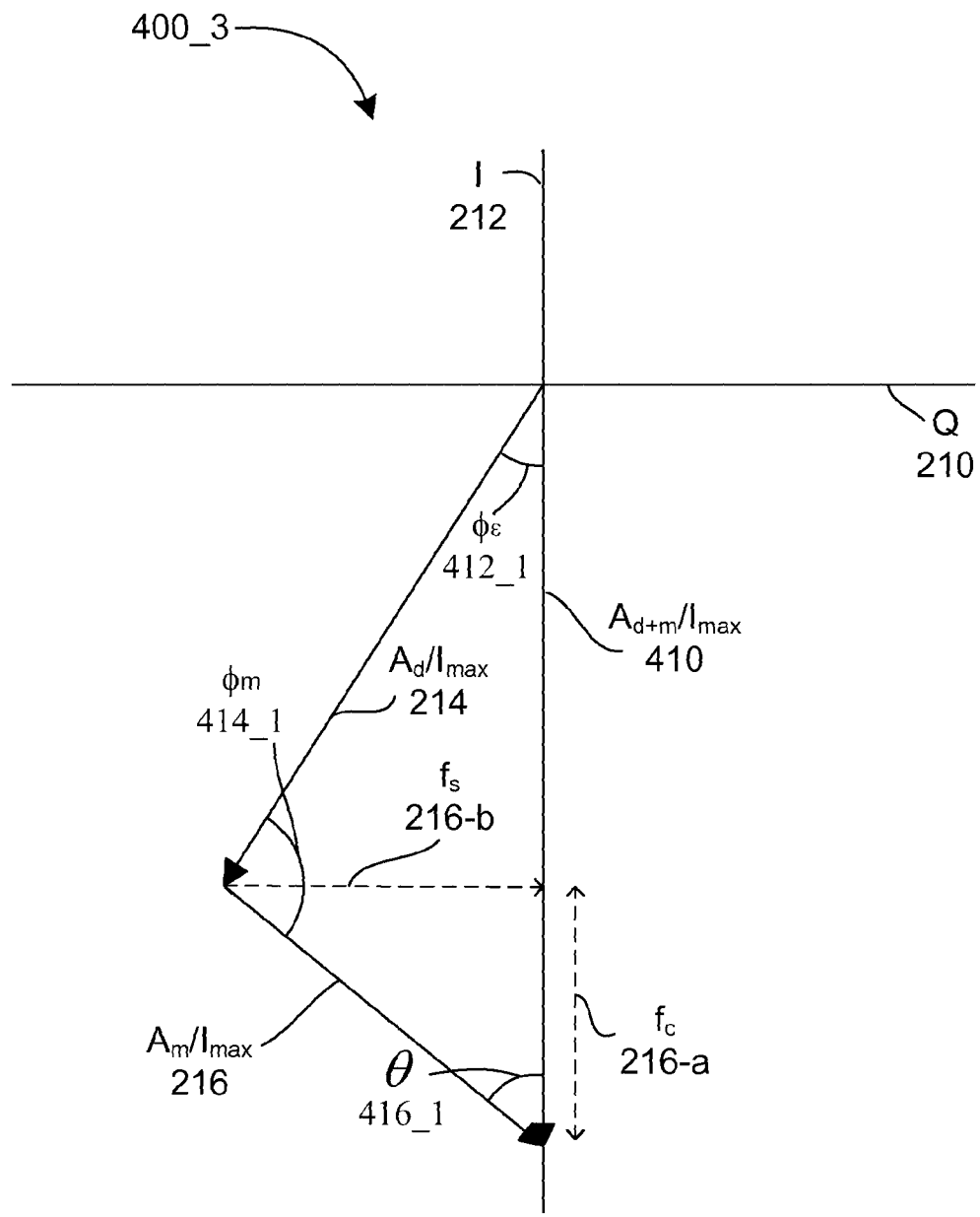
FIG. 4F illustrates a tracked vector, normalized to a steady state value of the composite signal, after the direct-path signal and the multi-path signal have undergone the phase reversal.

FIGS. 4D, 4E and 4F illustrate vectors corresponding to the direct path, multi-path and composite signals normalized to a maximum value ($I_{MAX}$) of the steady state in-phase component of the composite signal, during a steady state portion of the composite signal (e.g., prior to a transient state portion corresponding to a code chip edge of the direct path signal), during a transient state portion of the composite signal (e.g., between the start of a code chip edge of the direct path signal and the end of the code chip edge of the multi-path signal), and after the transient state portion of the composite signal, respectively.

As shown in FIGS. 4D-4F, $f_c$ and $f_s$ are orthogonal components of the multi-path signal, normalized to a maximum value of the in-phase component of the composite signal ($I_{MAX}$), along (e.g., in-phase with or projected onto) the composite signal and orthogonal to the composite signal, respectively. Mathematically, $f_c = A_m \cos(\theta)/I_{MAX}$ and $f_s = A_m \sin(\theta)/I_{MAX}$. In some embodiments, the introduction of steady state values of the in-phase component of the multi-path signal (e.g., values of $I_{MAX}$) improves computational efficiency of the algorithm described with reference to FIGS. 12A-12F below, by simplifying the mathematical formulations. The simplifications include, for example, eliminating variables from the mathematical equations, thereby reducing the number of variables that need to be solved, providing normalization constants to the remaining variables, thereby simplifying the equations to be solved, and providing modified normalized variables for which initial value conditions are easier to heuristically estimate.

Further, as shown in FIG. 4D, in some embodiments, the phase error $\phi_\epsilon$ 412_1 can be expressed as a trigonometric function (e.g., an arc sin) defined with respect to the orthogonal representations ($f_c$ and $f_s$) of the multi-path signal. The trigonometric arc sine (or inverse sine) function is numerically efficient to compute (e.g., as compared to other trigonometric inverse functions such as an arc tangent function). As shown in FIG. 4D, the phase error between the direct path and composite signal is obtained, in some embodiments, using the following equation:

$$\phi_c = \sin^{-1}\left(\frac{f_s}{\sqrt{(1-f_c)^2 + f_s^2}}\right)$$

Figure 5:
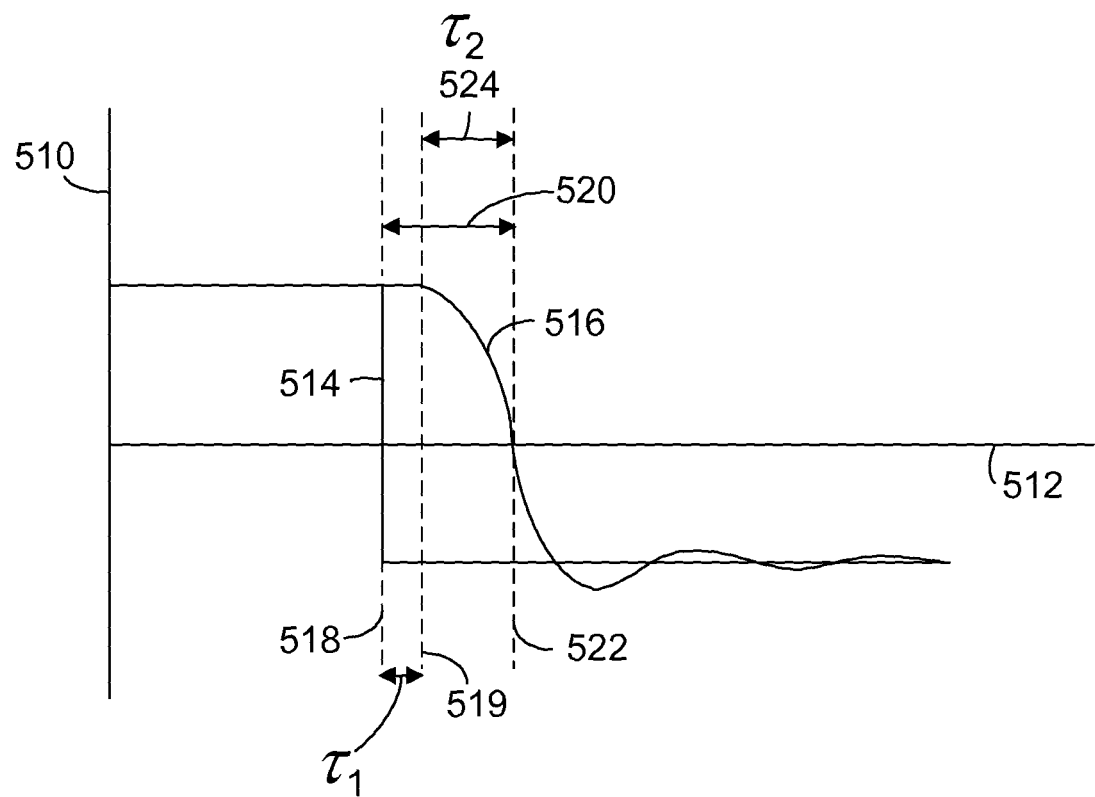
FIG. 5 is a prophetic diagram that illustrates a filter step response and the receiver tracking error caused by multi-path.

FIG. 5 is a prophetic diagram that illustrates the magnitude 510 versus time 512 of an instantaneous filter step response 514 and a filter step response 516 of a 6-pole Butterworth filter with an intermediate frequency equivalent bandwidth of 30 MHz. In some embodiments, a time error 520 between a time $t_1$ 522 corresponding to a zero crossing in the filter step response 516 and a time 518 corresponding to the ideal instantaneous step response 514 occurs as a result of code multi-path. With the time delay inherent in any filter response eliminated from the diagram, the time error 520 illustrates a code-tracking error caused by code multi-path. Some sophisticated correlator designs, such as those using a double-delta correction, reduce this error but do not eliminate it. FIG. 5 further illustrates a code tracking timing offset $\tau_1$ corresponding to a time interval between the ideal instantaneous step response 514 and a transition time 519 of the filter step response 516. Further illustrated in FIG. 5 is time delay $\tau_2$ 524, between the direct path and multi-path signals due to multi-path effect. Time delay $\tau_2$ 524 corresponds to a time interval between the transition time 519 of the filter step response 516 of the composite signal and the zero crossing time 522 in the filter step response 516.

A bandwidth of 30 MHz is wide for receivers in current high precision global navigation satellite systems (GNSS) but bandwidths of this magnitude are becoming more common as signal processing speeds increase, in part to achieve greater observability of multi-path signals. In addition, this bandwidth is typical of signal bandwidths supported by the modern satellites in the global navigation satellite systems (GNSS). Some typical filters with a bandwidth of 30 MHz have a filter step response time of almost 50 ns to transition the phase reversal and do not obtain steady state for almost 150 ns. Other filters have a filter step response time of almost 40 ns to transition the phase reversal and steady state is not obtained for almost 200 ns (i.e., the filter step response time corresponding to the filter is between 40 ns and 200 ns, and more generally is less than or equal to 200 ns). Other filters have a bandwidth of 10 MHz and a filter step response time less than 1 μs. Tracking processes 400 in FIGS. 4A-4C are only a reasonable model when the time delay $\tau_2$ is greater than about 50 ns, which requires that a difference in the path-length of the direct-path signal 114 (FIG. 1) and the multi-path signal 116 (FIG. 1) be at least 50 feet.

Figure 6:
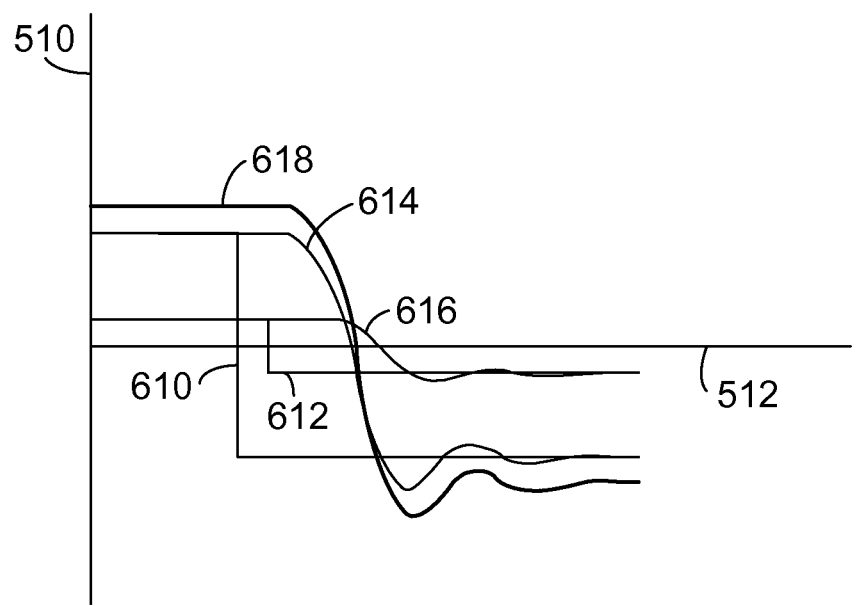
FIG. 6 is a prophetic diagram that illustrates the filter step response for the direct-path signal, the multi-path signal and the composite signal.

The consequences of the filter step response for the direct-path, multi-path and composite signals are illustrated in FIG. 6 including direct-path instantaneous filter response 610, multi-path instantaneous filter response 612, direct-path filter step response 614, multi-path filter step response 616 and composite filter step response 618. Note that in addition to the filter step response, such as filter step response 516 (FIG. 5), filter characteristics of filters, in receivers such as in device 110 (FIG. 1) and/or in one or more satellites, may also be characterized based on a filter impulse response or a complex filter transfer function.

Figure 7:
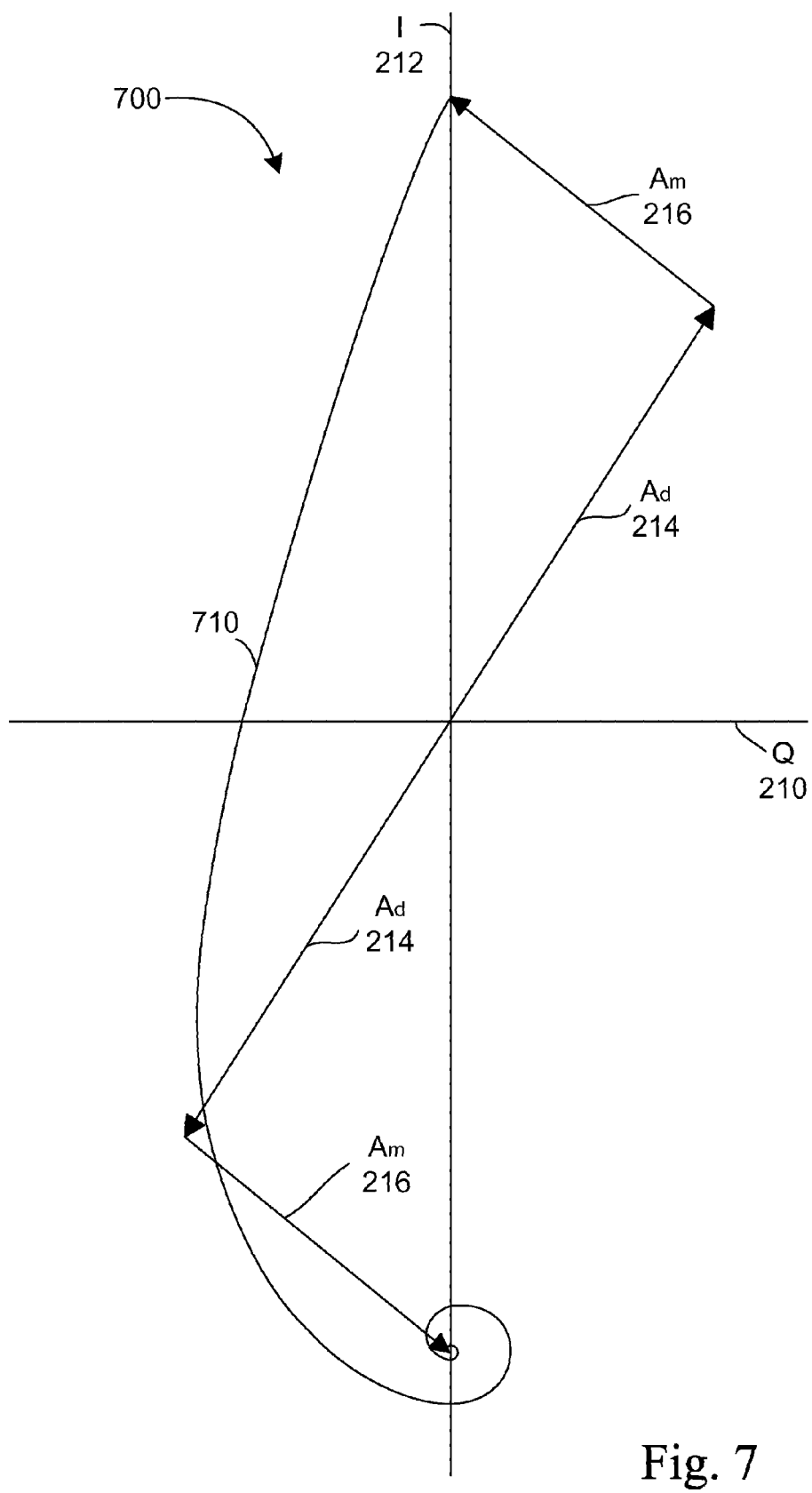
FIG. 7 is a prophetic diagram that illustrates a tracked vector during phase reversal of a band-limited direct-path signal and a band-limited multi-path signal.

FIG. 7 illustrates a tracking process 700 for tracking a multi-path signal 116 (FIG. 1) having a path length difference less than 50 feet during the code chip transitions for the direct-path signal 316 (FIG. 3) and the multi-path signal 318 (FIG. 3). In this illustration, the direct-path signal 316 (FIG. 3) and the multi-path signal 318 (FIG. 3) are band limited using a filter having a filter step response such as filter step response 516 (FIG. 5). The I 212 and Q 210 components of the tracking process 700 during the code chip transitions follow trajectory 710 rather than the instantaneous transitions shown in FIGS. 4A-4C. Note that the trajectory 710 shows that a vector representing the multi-path signal 216 (FIG. 2) begins the code transition before a vector representing the direct-path signal 214 (FIG. 2) has concluded its code transition. As described below, by fitting a measured trajectory 710 during the code transitions in the direct-path signal 114 (FIG. 1) and the multi-path signal 116 (FIG. 1) in accordance with at least a predetermined filter characteristic, such as the filter step response 516 (FIG. 5), one or more multi-path-induced errors may be determined and mitigated.

Figure 8:
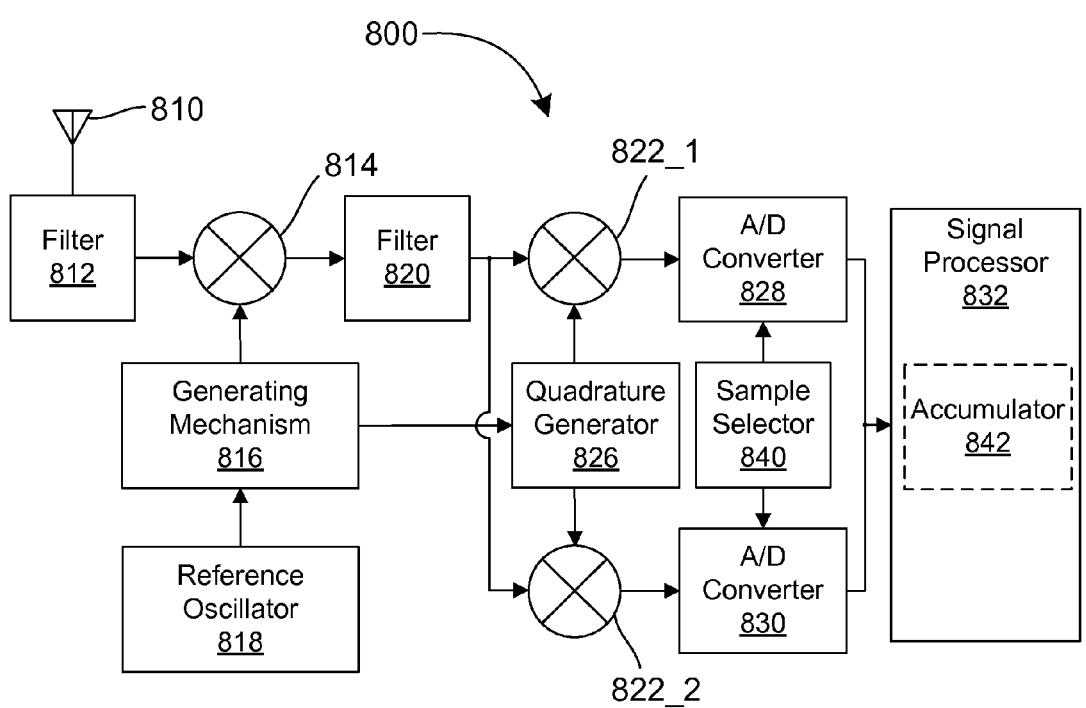
FIG. 8 is a block diagram of front-end electronics in a typical device for use in the global navigation satellite system (GNSS), in accordance with some embodiments.

A block diagram of a typical front-end 800 of a receiver in a device, such as device 110 (FIG. 1), is shown in FIG. 8. An antenna 810 receives a signal from one or more satellites. In some embodiments, the antenna 810 is equipped with a built-in amplifier. The signal is passed through a wide-bandwidth filter 812 to exclude out-of-band interference. After filtering, the signal consists of an L-band carrier signal that has been spread across a 10 MHz or wider bandwidth by an embedded spread-spectrum pseudo-random-noise code. The total information content of the signal is determined by the bandwidth of the satellite. In one embodiment, this bandwidth is slightly less than 30 MHz.

The L-band signal is next down-converted to an intermediate or base band frequency in mixer 814 by mixing with a signal generated by generating mechanism 816 based on reference oscillator 818 and is filtered by a band-pass filter 820. The down conversion step is typically included, but is not required, because it is much easier to sample and filter signals at frequencies of a few hundred Megahertz or lower than it is to work with signals at the 1 to 2 GHz L-band transmitted carrier signal frequencies. The bandwidth of the final filter 820 must be at least the bandwidth of the satellite signal (e.g., 30 MHz) or a portion of the information content of the satellite signal will be lost. In particular, the details of the code transitions are degraded if the bandwidth of the filter 820 is less than the satellite bandwidth, which for newer GPS satellites is about 30 MHz.

Quadrature generator 826 and mixers 822_1 and 822_2 generate in-phase I and quadrature Q components of the filtered signals. In some embodiments, the quadrature generator 826 and the mixers 822 also provide a final down conversion of the signals to base band. The in-phase I and quadrature Q signals are converted from analog-to-digital form by A/D converters 828 and 830, and the samples to be selected during the steady state and/or transient state of the direct, multi-path and composite signals are determined by Sample Selector 840. In some embodiments, the in-phase I signals and quadrature Q signals are hard-limited or clipped. The digital samples are processed by a signal processor 832. In some embodiments, Accumulator 842 stores the selected samples obtained from A/D converters 828 and 830.

Note that in some embodiments multi-bit A/D conversions are used in order to limit signal processing losses. In addition, A/D converters 828 and 830 may have very narrow sampling apertures so the timing of the samples is precisely known. Wide aperture converters produce samples that are the average value of the analog signal over the aperture period, which equivalently attenuates the high frequency content of the signal that is sampled. In addition, the sampling rate of the A/D converters 828 and 830 must exceed the Nyquist requirements based on the information bandwidth of the signals. Since the satellite signals have an information bandwidth on the order of 30 MHz, the receiver must either make complex (in-phase I and quadrature Q) measurements at a rate equal to or greater than 30 MHz or make real measurements (with a single A/D converter) at a rate that is at least twice the information bandwidth. In an exemplary embodiment of the device 110 (FIG. 1), complex measurements are made at a rate of 40 MHz.

Figure 9:
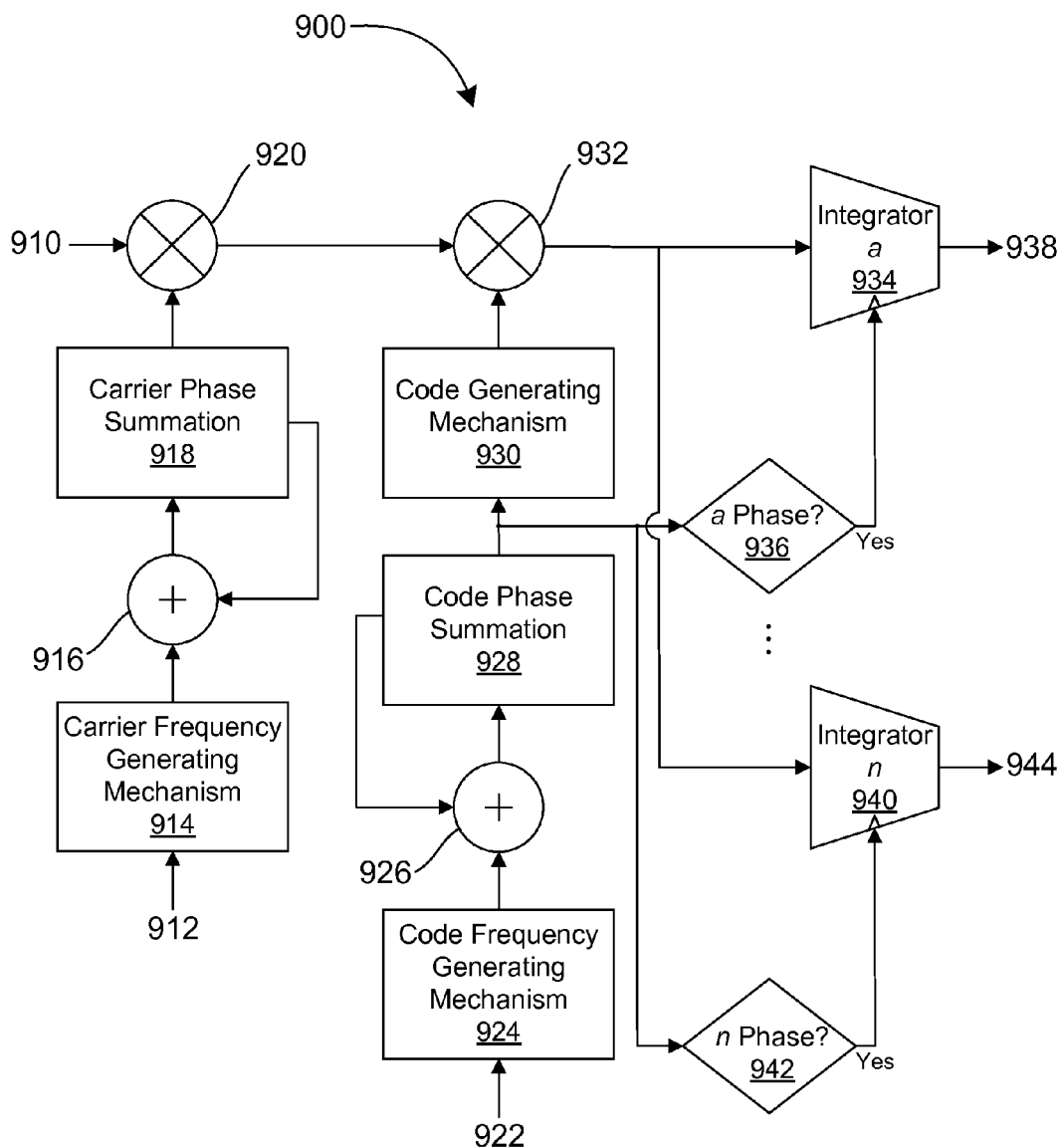
FIG. 9 is a block diagram of signal processing in the typical device for use in the global navigation satellite system (GNSS), in accordance with some embodiments.

FIG. 9 is a block diagram of a signal processor 900 suitable for use as signal processor 832 in FIG. 8. FIG. 9 depicts a single receiver channel. In some receivers, there are 10 to 50 nearly identical channels to receive signals from different satellites. Note that in order to perform the signal processing functions described below, the receiver must already have coherent tracking of signals from one or more satellites. In particular, there must be carrier lock, where a Doppler of a reference signal in a carrier tracking loop (not shown) in the receiver matches the Doppler of the carrier signal, and a code lock based on a code tracking loop (not shown) in the receiver, which allows the recovery of the maximum of the signal power in the spread-spectrum pseudo-random-noise code.

The signal processor 900 receives in-phase I and quadrature Q samples 910 from the front-end 800 of the receiver. The samples 910 are mixed in mixers 920 and 932 with a replica of the carrier signal and code signal. In some embodiments, the mixing in mixers 920 and 932 may be performed in reverse order or may be combined in a single mixing step. The mixing in mixer 920 consists of a complex rotation of the in-phase I and quadrature Q samples 910 by an angle corresponding to a phase of the replica of the carrier signal. The angle is generated by an output 912 from the carrier tracking loop that drives a carrier frequency generating mechanism 914. An adder 916 and carrier phase summation 918 generate a running digital summation corresponding to the phase. The rotation may be performed on the samples 910 at the code chip rate. This rotation removes any Doppler and any remaining intermediate frequency phase rotations from the samples 910. In some embodiments, the rotation takes place fast enough to satisfactorily, i.e., with measurable instrumentation loss, remove any Doppler and/or any remaining intermediate frequency phase rotations from the samples 910. The carrier tracking loop, which controls the phase and frequency of the replica of the carrier signal by feedback, may be implemented in an Application Specific Integrated Circuit (ASIC), in software or a combination of an ASIC and software. If the phase and frequency of the replica of the carrier signal are correct, the results of the rotation are true-base-band, zero-Doppler samples.

The mixing in mixer 932 removes the spread-spectrum pseudo-random-noise code from the samples. The phase and timing of the code are controlled by feedback from the code tracking loop that may be implemented in an ASIC, in software or a combination of an ASIC and software. Output 922 from the code tracking loop drives a code frequency generating mechanism 924. Adder 926 and code phase summation 928 generate a running digital sum. An output from the code phase summation 928 drives a code generating mechanism 930. For a bi-phase modulation, an output from the code generating mechanism 930 is ±1 corresponding to binary phase shift keying. The output of the code generating mechanism 930 may change sign only at the code chip edge rate.

If the phase and frequency of the replica of the code signal is correct, the code is removed from the samples and the samples are said to be correlated. The resulting de-spread samples represent constant, zero-Doppler samples (DC term) that can be integrated over time. Successfully correlated samples can be summed for extended intervals to improve a signal-to-noise ratio of the measurements. If the timing of the replica of the code signal is less than one code chip period in error (for the coarse acquisition code, for example, the code chip period is approximately 1 microsecond, the inverse of the code chip rate), the successive samples are de-correlated, and integration over time produces a smaller result than successfully correlated samples. If the timing of the replica of the code signal is greater than one code chip period in error, the successive samples are uncorrelated, and integration over time produces a near zero-mean result.

The samples of the satellite signal may be categorized according to the phase of the carrier frequency generating mechanism 914 and the code frequency generating mechanism 924. Typically, the carrier tracking loop uses all of the samples because this provides the best signal-to-noise ratio. On the other hand, the code tracking loop typically uses a subset of the samples, depending on an error discriminator that is used, such as double delta, strobed correlator or pulse amplitude correlator. In some embodiments, in order to obtain the best multi-path rejection, only the portion of the measured samples corresponding to code transitions that are near the code chip edges are used. For example, the code tracking loop may be configured to sum only those samples having a code phase fraction that is between 0.75 to 0.25 P-code chip periods (0.75 to 1.0 and 0.0 to 0.25). In this example, samples with phases between 0.25 and 0.75 (greater than 0.25 and less than 0.75) are discarded by the code tracking loop.

The satellite signal samples (other than ones that are discarded) are directed to a series of accumulators. Blocks 936 and 942 check the phase of the code phase summation 928 and enable the corresponding integrator (e.g., one of the integrators 934 and 940, which have outputs 938 and 944) for integrating a particular sample. While two accumulators are shown in FIG. 9, there may be additional accumulators. Typically, for a given receiver channel there are between 8 and 32 accumulators, each of which is used to accumulate satellite signal samples for a range of phases corresponding to that accumulator. In an exemplary embodiment, there are 16 accumulators. The use of multiple accumulators per channel enables tracking of the transition trajectory, such as trajectory 710 (FIG. 7). In addition, the larger number of accumulators can be used to increase the code search rate during signal acquisition.

Figure 10A:
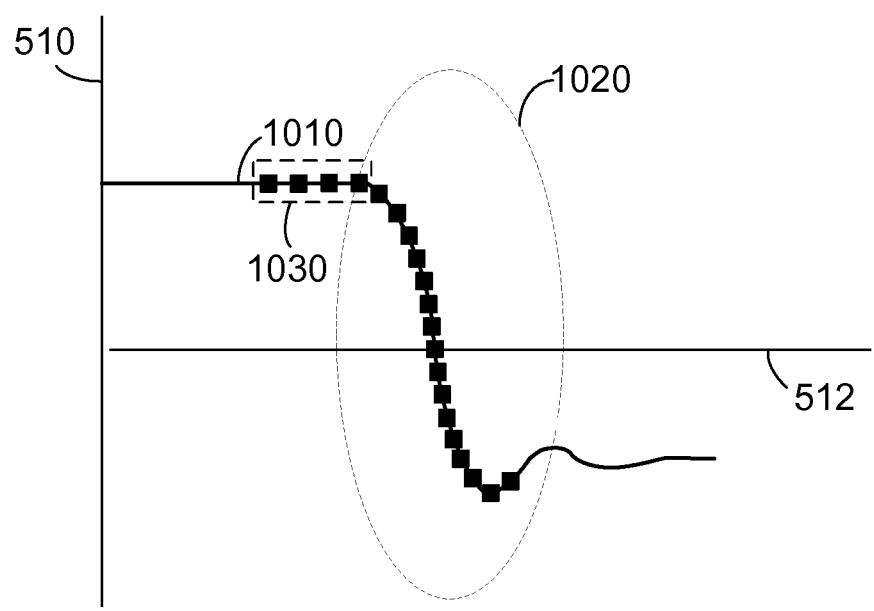
FIG. 10A is a prophetic diagram that illustrates samples of a filter step response measured during a steady state portion and a transient state portion of a composite signal, to correspondingly obtain steady state values and transient state values of an in-phase component of the composite signal, in accordance with some embodiments.

FIG. 10A is a prophetic diagram that provides an illustration of integrated samples 1020 corresponding to sixteen accumulators relative to the filter step response 1010. Integrated samples 1020 are generated by selectively integrating in-phase I and quadrature Q samples during the transient state portion of the composite signal (e.g., during an interval between a start of the code chip edge for the direct path signal and end of the code chip edge for the multi-path signal), which can be defined by time interval relative to the code chip edges. Integrated samples 1030 are generated by selectively integrating in-phase I and quadrature Q samples during the steady state portion of the composite signal (e.g., prior to a transient state portion of the composite signal corresponding to an interval prior to a start of the code chip edge for the direct path signal).

Figure 10B:
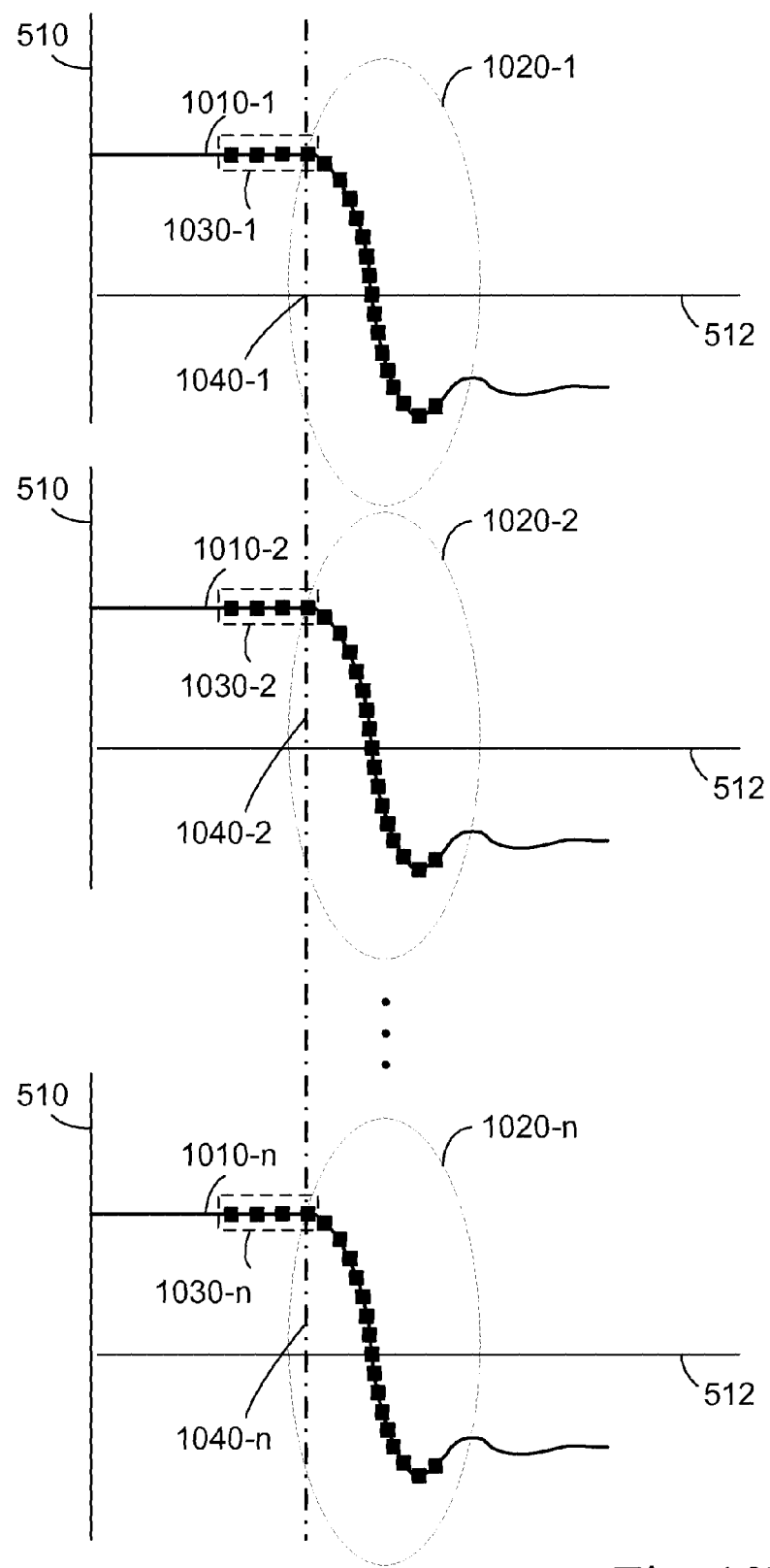
FIG. 10B is a prophetic diagram that illustrates a plurality of filter step responses measured and sampled during a corresponding plurality of steady state and transient state portions of an in-phase component of a composite signal; the plurality of filter step responses measured within a predefined measurement epoch and synchronized with respect to an estimate of a code tracking timing offset ($\tau_1$), in accordance with some embodiments.

FIG. 10B is a prophetic diagram that illustrates a plurality of filter step responses 1010-1, 1010-2, ... 1010-n) measured and sampled during a corresponding plurality of steady state portions (1030-1, 1030-2, ... 1030-n) and a plurality of transient state portions (1020-1, 1020-2, ... 1020-n) of an in-phase component of a composite signal. The filter step responses are measured within a predefined measurement epoch and synchronized with respect to an estimate of a code tracking timing offset ($\tau_1$) as illustrated by 1040-1, 1040-2, ... 1040-n.

Receivers may be categorized based on the number of integrators used by the receivers to integrate samples which are categorized based on their position relative to the code chip edges. The receivers typically take a nearly exact integer number of samples per code chip period. Each sample is assigned a sample number, and the receiver separately integrates for each sample number the respective samples, across multiple transitions. For example, if the receiver has four in-phase I and quadrature Q sample pairs per code chip period, it achieves a plus or minus one-quarter chip correlation by numbering the samples 1 through 4 relative to the code chip edge and by summing two subsets of the samples. A first subset only includes the sample 4, the one that occurs just before the code chip edge. A second subset only includes the sample 1, the one that occurs just after the code chip edge.

Intervals between the integrated samples 1020 may be 5 ns or less. A complex sampling and data processing rate of at least 200 MHz is required if the sampling technique described above is used to create such narrow sampling subsets. Such a high sampling rate is very expensive to implement in terms of power consumption, parts cost and implementation difficulty. It does, however, provide a high signal-to-noise ratio because there is at least one sample for every accumulator from every code transition.

In some embodiments, an alternative technique may be used to achieve the same results with much slower sampling rates. In these embodiments, the sample rate may be as low as 30 MHz, the lowest speed allowed by the Nyquist limit. This technique uses a sampling rate that is not an integer multiple of the code chip rate. Therefore, the timing of the samples with respect to the code transition changes with every code transition. Referring to FIG. 8, in these embodiments the reference oscillator 818 is intentionally offset relative to the carrier signal frequency from the one or more satellites, typically by 40-100 ppm (with a greatest dependence on the temperature of the reference oscillator 818). This corresponds to 60-150 kHz for L1 (1 ppm equals 1.57542 kHz at L1) and mimics the effect of a residual Doppler shift in the samples from A/D converters 828 and 830. This offset ensures that a timing of the code transitions will slowly vary with respect to a sampling time. This ensures that samples of the code transitions are uniformly distributed across multiple accumulators in the channel over a period of time.

Referring to FIG. 9, the phase of the code phase summation 928 for the replica of the code signal is used to determine which integrator, such as integrator 934, receives the sample for a given code transition. All that is required to provide finely spaced samples is a correspondingly fine test of the phase of the replica of the code signal. Since a temporal spacing of the samples is larger than a time interval between each of the accumulators, only a fraction of the accumulators are assigned a sample for each code transition. In fact, in some embodiments, only one accumulator is assigned a sample for each code transition. Over the span of many code chip periods, however, each accumulator receives many samples. This technique does have a relative disadvantage with respect to signal-to-noise ratio because only a fraction of the accumulators receive a sample for each code transition. Since a correlation time of multi-path signals having a path-length difference less than 50 ft is very long, however, the integrations can be continued for longer periods in order to achieve a required signal-to-noise ratio. Integration times of 100 ms to several seconds are sufficient, and are much shorter than the correlation time of multi-path signals having a path-length difference less than 50 ft.

If the exact shape of the trajectory 710 (FIG. 7) can be observed, the effect of multi-path-induced errors can be determined and removed. As shown in FIG. 6, multi-path interference has several observable effects upon the composite filter step response 618 including an increase in the amplitude, an increase in the filter characteristic response time such as a time duration of a step response and the time error $\tau_2$ 520 (FIG. 5) between the start of the phase reversal and the zero crossing.

The basic concept of the system and method is that the transition trajectory 710 (FIG. 7) and one or more multi-path-induced errors can be modeled by observing deviations between the observed composite signal, such as composite signal 314 (FIG. 3), and a computed direct signal using a pre-determined filter characteristic, such as filter step response 516 (FIG. 5). In some embodiments, the pre-determined filter characteristic is determined in a calibration procedure. In other embodiments, the calibration procedure may be repeated, for example, if there is a change in operating temperature. In some embodiments, the pre-determined filter characteristic may be based on the assumed filter of the satellite or the receiver. The pre-determined filter characteristic need not be a perfect replica of the actual filter characteristic. Rather, it needs to be similar enough to enable substantial mitigation of one or more multi-path-induced errors.

The required observations are illustrated by the integrated samples 1020 in FIG. 10. Although FIG. 10 represents the observations as one dimensional (real) samples, the samples of the code transition may be taken as two-dimensional (complex) samples, providing both an amplitude, such as composite signal amplitude $A_{d+m}$ 410 (FIG. 4A), and a phase (not shown) of the composite signal. If the shape of an error curve can be calculated, the amplitude $A_m$ 216 (FIG. 2), phase $\theta_m$ 220 (FIG. 2) and the time delay 6 of the multi-path signal 116 (FIG. 1) corresponding to the path-length difference can be determined and substantially corrected. In so doing, the phase error $\phi_\epsilon$ 412_1 (FIG. 4A) induced by the multi-path signal 116 (FIG. 1) can be robustly estimated and the multi-path-induced phase error can be mitigated. A signal analysis method (sometimes herein called an algorithm) that estimates the phase error $\phi_\epsilon$ 412_1 (FIG. 4A) based upon the model of the transition trajectory 710 (FIG. 7) is described below.

This signal analysis method estimates the parameters that define the trajectory 710 (FIG. 7), allowing the trajectory 710 (FIG. 7) to be modeled. The signal analysis is iterated each time a full and independent set of measurements is made (after integrating over many code transition cycles). The iteration time is chosen so that it is long enough to provide sufficient signal-to-noise ratio for a robust estimation and short enough that changes in the multi-path signal 116 (FIG. 1) can be observed. As noted previously, since multi-path interference with a short path-length difference, i.e., less than 50 ft, varies slowly with time, multi-path correlation times on the order of several hundreds of seconds occur, and iteration rates from 100 ms to a few seconds are typical.

The mathematical formulation for the signal analysis method 1200 described below uses the following notations:
the amplitude of the direct-path signal $A_d$ 214 (FIG. 2);
the amplitude of the multi-path signal $A_m$ 216 (FIG. 2);
the amplitude of the composite signal $A_{d+m}$ 410 (FIGS. 4A-4C);
the maximum amplitude of the composite signal $I_{MAX}$ measured using a steady-state signal tracking loop; and
the phase error $\phi_\epsilon$ 412_1 between the direct path signal and the composite signal (FIGS. 4A-4C);
the phase difference $\phi_m$ 414_1 between the multi-path signal and the direct path signal (FIGS. 4A-4C);
the time delay $\tau_2$ between the direct path and multi-path signals due to multi-path effect (FIG. 5);
a code tracking timing offset $\tau_1$ (FIG. 5);
a pre-determined filter step response S(t), where t is time (FIG. 10A);
the in-phase $I_t$ and quadrature $Q_t$ base-band measurements taken at multiple times during a transient state portion (e.g., corresponding to samples 1020, FIG. 10A) of the composite signal (e.g., between the start of a code transition in the direct path signal and the end of a code transition in the multi-path signal).

For a given code transition, $I_t$ and $Q_t$ can be expressed as $$I_t = A_d S(\tau_1) \cos(\phi_\epsilon) + A_m S(\tau_2) \cos(\theta) \quad (1)$$

$$Q_t = A_d S(\tau_1) \sin(\phi_\epsilon) - A_m S(\tau_2) \sin(\theta) \quad (2)$$

where $\theta$ is the phase difference 416_1 between the multi-path signal and the composite signal given by $\theta = \pi - (\phi_\epsilon - \phi_m)$.

The transition trajectory 710 (FIG. 7) is a plot of the I(t) versus Q(t) at the time of a code transition on the direct-path signal 114 (FIG. 1), followed closely in time by the same code transition of the delayed multi-path signal 116 (FIG. 1). The filter step response, such as filter step response 1010 (FIG. 10), of a filter in either the receiver or a satellite defines the shape of these code transitions. As shown in FIG. 5, the code transitions are a function of time. As noted previously, however, the pre-determined filter step response need not be a perfect replica of the actual filter characteristic. Also note that an initial estimate for the time $t_0$ 518 corresponding to the ideal instantaneous filter step response is provided by the code tracking loop (not shown). The parameters determined in method 1200 described below can be used to correct this residual multi-path-induced error in the pseudo-range navigation computation as well as the phase error $\phi_\epsilon$ 412_1 (FIG. 4A).

FIGS. 12A-12E illustrate a flow chart for a method 1200 of mitigating the effect of a multi-path-induced error in a global navigation satellite system (GNSS).

Method 1200 comprises, for a respective measurement epoch, obtaining (1202) respective representations of a composite signal including a plurality of value-pairs of the composite signal obtained during a corresponding plurality of time instances (e.g., N time instances or samples, where N is a positive integer such as 16, 32, 48 or the like) of one or more transient state portions of the composite signal (e.g., samples 1020 obtained during the transient state portion of the multi-path signal, FIG. 10A). The composite signal includes (1204) a band-limited direct-path signal (e.g., direct path signal 114, FIG. 1) and at least one band-limited multi-path signal (e.g., multi-path path signal 116, FIG. 1). In some embodiments, obtaining respective representations of the composite signal include (a) measuring and/or (b) numerically estimating time-varying values of: (a) in-phase and (b) quadrature components of the composite signal.

In some embodiments, a transient state portion of the one or more transient state portions corresponds to (1206) a portion of the composite signal during which the composite signal undergoes a phase reversal (e.g., interval 320, FIG. 3). In some embodiments, the phase reversal results from a code chip edge. In some embodiments, the respective measurement epoch includes (1208) a plurality of transient state portions of the composite signal (e.g., as explained with reference to FIG. 10B). In some embodiments, a respective measurement epoch includes M transient state portions, where M is a positive integer such as 10, 100, 1000, or the like. In some embodiments, the time delay ($\tau_2$) or the multi-path signal relative to the direct-path signal is substantially constant during the respective measurement epoch. In some embodiments, a respective measurement epoch extends over a duration of time spanning 1 second, 10 seconds, 100 seconds, or the like.

In some embodiments, each respective value pair of the plurality of value-pairs of the composite signal includes (1210): a representation of an in-phase component of the composite signal obtained (e.g., computed or measured value of $I_t$) during a respective instance of the plurality of time instances of the one or more transient state portions of the composite signal; and a representation of a quadrature phase component of the composite signal obtained (e.g., computed or measured value of $Q_t$) during the respective instance of the plurality of time instances of the one or more transient state portions of the composite signal.

In some embodiments, the equations which describe the in-phase component of the composite signal (I) and quadrature-phase component of the composite signal (Q) measurements are:

$$I_t = A_d S(\tau_1) \cos(\phi_e) + A_m S(\tau_2) \cos(\theta) \quad (1)$$

$$Q_t = A_d S(\tau_1) \sin(\phi_e) - A_m S(\tau_2) \sin(\theta) \quad (2)$$

In some embodiments, steady state values (e.g., prior to the phase reversal, as shown in FIG. 4A and FIGS. 10A-10B) of the in-phase component of the composite signal (I) and quadrature-phase component of the composite signal (Q) measurements are used to eliminate two or more variables from equations (1) and (2) described above. Specifically, in some embodiments, the steady state value of Q (e.g., while the composite signal is not undergoing phase reversal) is zero (e.g., as shown in FIGS. 4A and 4D). In such embodiments, equation (2) during steady state is rewritten as:

$$A_d \sin(\phi_e) = A_m \sin(\theta) \quad (3)$$

In some embodiments, a maximum value of the in-phase component (e.g., Imo, FIG. 4A) of the composite signal during a steady state portion of the composite signal is given by the equation (e.g., as shown in FIG. 4A):

$$I_{MAX} = A_d \cos(\phi_e) + A_m \cos(\theta) \quad (4)$$

In some embodiments, one or more variables in equations (1) and (2) are substituted using the following equations:

$$A_{ms} = A_m \sin(\theta) = A_{ds} = A_d \sin(\phi_e)$$

$$A_{mc} = A_m \cos(\theta) = I_{MAX} - A_d \cos(\phi_e) = I_{MAX} - A_{dc} \quad (5)$$

where $A_{mc}$ is a component of the multi-path signal in-phase with the composite signal (e.g., as explained with reference to FIG. 4A) and $A_{ms}$ is a component of the multi-path signal orthogonal to the composite signal (as shown in FIG. 4A).

With these changes equations (1) and (2) can be rewritten as:

$$I_t = I_{MAX} S(\tau_1) - A_{mc}[S(\tau_1) - S(\tau_2)] \quad (6)$$

$$Q_t = A_{ms}[S(\tau_1) - S(\tau_2)] \quad (7)$$

Equations (6) and (7) describe the theoretical equations as a function of time for the I and Q measurements. These two equations actually become simpler by normalizing these equations by the value of $I_{MAX}$ measured just before the bit transmission commences (e.g., as shown in FIGS. 4D-4F).

In some embodiments, the representation of the in-phase component (e.g., equation (6)) of the composite signal and the representation of the quadrature phase component (e.g., equation (7)) of the composite signal are each normalized (1212) with respect to a value (e.g., maximum value) of an in-phase component (e.g., $I_{MAX}$, FIG. 4A) of the composite signal obtained during a steady state portion of the composite signal. For example, in equations (8) and (9), normalized values of the in-phase component of the composite signal and the representation of the quadrature phase component of the composite signal are indicated with a prime (as illustrated in FIGS. 4D-4F).

$$I'_t = S(\tau_1) - f_c[S(\tau_1) - S(\tau_2)] \quad (8)$$

$$Q'_t = f_s[S(\tau_1) - S(\tau_2)] \quad (9)$$

In equations (8) and (9), the values of $f_c$ and $f_s$ are the normalized values of $A_{mc}$ and $A_{ms}$ (e.g., see FIGS. 4D-4F). The measured values of the I and Q functions during the transition are also normalized, by dividing the measured I and Q values by the value of $I_{MAX}$. The four parameters to be determined are $f_c$, $f_s$, $\tau_1$ and $\tau_2$.

Accordingly, in some embodiments, the introduction of steady state values of the in-phase component of the multi-path signal (e.g., values of $I_{MAX}$) improves computational efficiency of the algorithm described with reference to method 1200, by simplifying the mathematical formulations used to compute the four parameters. For example, introducing or making use of the steady state values simplifies mathematical computation by eliminating variables from the mathematical equations, thereby reducing the number of variables to be solved, by providing normalization constants to the remaining variables, thereby simplifying the equations to be solved, and by providing modified normalized variables for which initial value conditions are easier to heuristically estimate.

In some embodiments, with respect to the measurement epoch, obtaining respective representations of a composite signal includes (1214), prior to obtaining the plurality of coefficients for the set of linear equations: synchronizing (1216) a plurality of transient state portions of the composite signal in accordance with an estimate for a code tracking timing offset ($\tau_1$) (for example, synchronizing transient state portions 1020-1, 1020-2, 1020-n, . . . 1020-n, as shown in FIG. 10B based on a current estimate of the code tracking timing offset ($\tau_1$)); averaging (1218) the synchronized plurality of transient state portions of the composite signal to obtain an averaged representation of the plurality of transient state portions of the composite signal; and obtaining (1220) the plurality of value-pairs of the composite signal during the corresponding plurality of time instances of the averaged representation of the plurality of transient state portions of the composite signal.

With respect to the measurement epoch (1222), method 1200 includes performing one or more of steps 1224-1250.

The method includes obtaining (1224) a plurality of coefficients for a set of linear equations based on the plurality of value-pairs of the composite signal. In some embodiments, obtaining a plurality of coefficients for a set of linear equations includes obtaining (1226) one or more representations of (e.g., a step response, a time-derivative of the step response, or a numerical approximation obtained by numerical subtraction of the time derivative of the step response) a pre-determined filter characteristic of one or more filters in the GNSS, that are used to band limit the direct-path signal and the multi-path signal, evaluated at respective values (e.g., initial estimates, or current value) of a code tracking timing offset ($\tau_1$) and at a time delay ($\tau_2$).

In some embodiments, obtaining a plurality of coefficients for a set of linear equations comprises forming error equations between representations of measured values (e.g., measured values normalized by $I_{MAX}$), and the representations of computed values for the in-phase and quadrature phase components of the multi-path signal are obtained using the following equations:

$$\epsilon_I = \bar{I}'_t - I'_t = \bar{I}'_t - S(\tau_1) + f_c[S(\tau_1) - S(\tau_2)] \quad (10)$$

$$\epsilon_Q = \bar{Q}'_t - Q'_t = \bar{Q}'_t - f_s[S(\tau_1) - S(\tau_2)] \quad (11)$$

In equations (10) and (11) the measured and normalized values of I and Q as a function of time are indicated with a bar over them. The normalizing by $I_{MAX}$ is indicated with the prime.

In some embodiments, obtaining a plurality of coefficients for a set of linear equations further includes computing partial derivatives of the error equations (e.g., equations (10) and (11)) with respect to each parameter (e.g., by making a linear approximation of the equation around an initial estimate of each parameter). For example, taking the partial derivatives of equations (10) and (11) with respect to the errors for the desired parameters gives:

$$-(1-f_c)\dot{S}(\tau_1)\Delta\tau_1 - f_c\dot{S}(\tau_2)\Delta\tau_2 - [S(\tau_1)-S(\tau_2)]\Delta f_c + \epsilon_I = 0 \quad (12)$$

$$[S(\tau_1)-S(\tau_2)]\Delta f_s + f_s\dot{S}(\tau_1)\Delta\tau_1 - f_s\dot{S}(\tau_2)\Delta\tau_2 + \epsilon_Q = 0 \quad (13)$$

In equations (12) and (13) the dot over the S indicates the time derivative of the step response curve. Writing equations (12) and (13) in terms of generalized coefficients gives:

$$a_1\Delta\tau_1 + a_2\Delta\tau_2 + a_3\Delta f_c + 0\Delta f_s + a_5 = 0 \quad (14)$$

$$b_1\Delta\tau_1 + b_2\Delta\tau_2 + 0\Delta f_c + b_4\Delta f_s + b_5 = 0 \quad (15)$$

In some embodiments, obtaining the plurality of coefficients for a set of linear equations includes, for each time point in the transient portion of the composite signal, determining the coefficients of both equation (14) and equation (15) from equations (12) and (13).

In some embodiments, a least squares equation is formed by squaring each of the two equations (14) and (15), taking the derivative of each squared equation with respect to each parameter and then adding the result into the least squares matrix equation for each time point in the transient portion of the composite signal.

For example, when equation (14) is squared, all the terms of the squared equation with a dependence upon $\Delta\tau_1$ are:

$$a_1^2\Delta\tau_1^2 + a_1a_2\Delta\tau_1\Delta\tau_2 + a_1a_3\Delta\tau_1\Delta f_c + 0a_1\Delta\tau_1\Delta f_s + a_1a_5\Delta\tau_1 \quad (16)$$

By taking the derivative of these terms and setting the result to zero, an equation which is linear in the neighborhood of the current estimate of $\Delta\tau_1$ is obtained. The result is:

$$2a_1^2\Delta\tau_1 + 2a_1a_2\Delta\tau_2 + 2a_1a_3\Delta f_c + 2a_10\Delta f_s + 2a_1a_5 = 0 \quad (17)$$

Since every derivative equation formed in this fashion will have common factors of two on each term, each equation is simplified by dropping the factor of two. Squaring and taking derivatives of the terms in equation (15) will give rise to an equation similar to equation (17) as a linear equation by which to adjust the value of $\Delta\tau_1$. In some embodiments, the resulting two equations are added together into a composite equation (e.g., equation (18)).

In some embodiments, corresponding to each time point the equation for the $\Delta\tau_1$ dependence is given by the equation:

$$(a_1^2 + b_1^2)\Delta\tau_1 + (a_1a_2 + b_1b_2)\Delta\tau_2 + (a_1a_3)\Delta f_c + (b_1b_4)\Delta f_s + (a_1a_5 + b_1b_5) = 0 \quad (18)$$

In some embodiments, obtaining the plurality of coefficients for a set of linear equations includes generating a similar equation (e.g., such as equation (18)) for each time point in the transient portion of the composite signal which generates a linear approximation to adjust each of the other parameters. In some embodiments, obtaining the plurality of coefficients for a set of linear equations further includes, for each point in time adding together the equations formed to get the matrix equation (19):

$$\begin{pmatrix} c_{11} & c_{12} & c_{13} & c_{14} & c_{15} \\ c_{12} & c_{22} & c_{23} & c_{24} & c_{25} \\ c_{13} & c_{23} & c_{33} & c_{34} & c_{35} \\ c_{14} & c_{24} & c_{34} & c_{44} & c_{45} \\ c_{15} & c_{25} & c_{35} & c_{45} & c_{55} \end{pmatrix} \begin{pmatrix} \Delta\tau_1 \\ \Delta\tau_2 \\ \Delta f_c \\ \Delta f_s \\ res^2 \end{pmatrix} = \begin{pmatrix} 0 \\ 0 \\ 0 \\ 0 \\ 0 \end{pmatrix} \quad (19)$$

Each element of this matrix is formed by summing over the products of the a and b coefficients in the following manner:

$$c_{ij} = \Sigma(a_ia_j + b_ib_j) \quad (20)$$

The summation in equation (20) is taken over the total number of samples of I and Q, i.e., sample equation (12) and (13) for each time point. Note that any coefficient of the matrix in the third column or row will not include the product of the b's since the third b ($b_3$) is zero (e.g., there is no dependence of the Q error equation upon the value of $\Delta f_c$). Similarly, any coefficient in the fourth row or column will not contain a product of the a's since the fourth a ($a_4$) is zero.

In some embodiments, the last row of equation (19) is not required to obtain a solution for the parameters. In some embodiments, the last row of equation (19) is used to compute the square of the residuals which will result after the parameters (e.g., $f_c$, $f_s$, $\tau_1$ and $\tau_2$) are adjusted by the solution or are updated by the respective update values.

The method includes iteratively (e.g., a plurality of times) obtaining (1228) solutions for the set of linear equations (for example, as described with reference to operations 1230-1244), thereby solving for a code tracking timing offset ($\tau_1$), a time delay ($\tau_2$) of the multi-path signal relative to the direct-path signal, and orthogonal representations of the multi-path signal. In some embodiments, the code tracking timing offset ($\tau_1$) is (1230) an estimate of a time instance corresponding to a code chip edge transition for the direct path signal.

In some embodiments, the orthogonal representations of the multi-path signal include (1232): a normalized in-phase component of the multi-path signal ($f_c$), comprising an in-phase component of the multi-path signal normalized with respect to an in-phase component (e.g., normalized with respect to a maximum value of the in-phase component Imo) of the composite signal obtained during a corresponding steady state portion of the composite signal; and a normalized quadrature (e.g., relative to the composite signal) component of the multi-path signal ($f_s$), comprising a quadrature component of the multi-path signal normalized with respect to the in-phase component (e.g., with respect to a maximum value of the in-phase component $I_{MAX}$) of the composite signal obtained during the corresponding steady state portion of the composite signal. For example, the value of $f_c$ and $f_s$ are normalized values of $A_{mc}$ and $A_{ms}$ with respect to $I_{MAX}$ (e.g., as described with reference to equation 5, and FIGS. 4A-4F). In some embodiments, the normalized in-phase component of the multi-path signal ($f_c$) is in-phase relative to the composite signal or a projection of the multi-path signal onto the composite signal, as shown in FIGS. 4D-4F. In some embodiments, the normalized quadrature component of the multi-path signal ($f_s$) is in quadrature relative to the composite signal or is a projection of the multi-path signal onto an axis orthogonal to the composite signal, as shown in FIGS. 4D-4F.

In some embodiments, iteratively obtaining solutions for the set of linear equations comprises: obtaining (1236) respective initial values of the code tracking timing offset ($\tau_1$), the time delay ($\tau_2$), the normalized in-phase component of the multi-path signal ($f_c$), and the normalized quadrature component of the multi-path signal (0; and computing (1238) updated values of $\tau_1$, $\tau_2$, $f_c$, and $f_s$, based on the obtained initial values of $\tau_1$, $\tau_2$, $f_c$, and $f_s$. In some embodiments, obtaining the respective initial values comprises obtaining values of $\tau_1$, $\tau_2$, $f_c$, and $f_s$ from a prior epoch.

Alternatively or in addition, in some embodiments, obtaining the respective initial values comprises estimating the respective initial values from empirically determined expected values. For example, since the multipath is generally smaller (e.g., significantly smaller) than the direct signal, $f_c$ and $f_s$ will generally be smaller than 0.25 in magnitude. Since the multipath signal can rotate through 360 degrees, both $f_c$ and $f_s$ can be positive or negative. When computing theoretical values of I and Q for the initial solution, one must choose initial values of the four parameters. The initial parameter for subsequent solutions can use the values determined at the prior epoch.

In some embodiments, for the first solution we assume that the value of $\tau_1$ is zero, i.e. given by the code transition correlation time. The value of $\tau_2$ is assumed to be about half way through the transition interval, e.g., six samples (out of 16 samples) later in the transition time. The value of $f_c$ is assumed to be zero since it has roughly equal probability of being either positive or negative. Finally, the initial value of $f_s$ can be selected by considering the largest value of the measured Q (after it is scaled by $I_{MAX}$). Specifically, the suggested initial value is obtained by setting $f_s$ equal to minus one-half of the scaled $Q_{MAX}$. The negative sign arises because the initial trajectory of the transition is opposite the sign of the sine component of the multipath. Half the value is chosen because of the non-linearity in the solution for the time delays. Because of the interaction between parameters, the larger the initial value of the estimate of $f_s$, the smaller the iterative correction to the time delay solution. The factor of one half seems to be a good compromise which leads to a smaller number of iterations to achieve convergence.

In some embodiments, computing updated values of $\tau_1$, $\tau_2$, $f_c$, and $f_s$ includes computing updated coefficients $c_{ij}$ for matrix equation (19) based on the current values (e.g., from the last or immediately prior iteration of the computation) of $\tau_1$, $\tau_2$, $f_c$, and $f_s$. In some embodiments, computing updated coefficients $c_{ij}$ for matrix equation (19) includes updating the error equations (e.g., equations (10) and (11)) by updating the representations of computed values for the (normalized) in-phase and quadrature phase components of the multi-path signal (e.g., $I'_t$ and $Q'$ in equations (10) and (11)) in accordance with the current values of $\tau_1$, $\tau_2$, $f_c$, and $f_s$ based on equations (10) and (11). In such embodiments, the measured (and normalized) values of the in-phase and quadrature phase components of the multi-path signal (e.g., $\overline{I'}_t$ and $\overline{Q'}_t$ in equations (10) and (11)) are preserved or held constant while the computed values of in-phase and quadrature phase components of the multi-path signal are updated. In such embodiments, computing updated coefficients for matrix equation (19) further includes updating equations (12)-(19) based on updated equations (10) and (11) (e.g., computing partial derivatives of the updated error equations (10) and (11) to update equations (12) and (13)), determining coefficients of updated equations (14) and (15), computing updated least squares equations (16)-(17), computing updated composite equation (18), and computing updated matrix equation (19) based on the current values of $\tau_1$, $\tau_2$, $f_c$, and $f_s$.

In some embodiments, computing updated values of $\tau_1$, $\tau_2$, $f_c$, and $f_s$ includes, iteratively: obtaining (1240) respective update terms, including obtaining respective estimates for: an update value ($\Delta\tau_1$) for the code tracking timing offset, an update value ($\Delta\tau_2$) for the time delay, an update value ($\Delta f_c$) for the normalized in-phase component of the multi-path signal, and an update value ($\Delta f_s$) for the normalized quadrature component of the multi-path signal; and updating (1242) respective values of $\tau_1$, $\tau_2$, $f_c$, and $f_s$ in accordance with the respective update terms to compute the updated values of $\tau_1$, $\tau_2$, $f_c$, and $f_s$. In some embodiments, after populating the entire matrix described in equation (19) (e.g., with the set of initial estimates), the respective update terms are computed by inverting the c matrix. The updated values are computed with the respective update terms and the entire process is iterated as necessary.

In some embodiments, a convergence criterion is used to determine when the iterative update process ends. For example, a threshold value/condition for the residuals or for the update terms (e.g., in the case of $\Delta\tau_1$) needs to be satisfied for the update process to be terminated and for convergence criterion to be met. As described above, in some embodiments, the last row of equation (19) is used to compute the square of the residuals which will result after the parameters (e.g., $f_c$, $f_s$, $\tau_1$ and $\tau_2$) are adjusted by the solution or are updated by the respective update values. In some embodiments, the residuals are quadratic in nature and the squared residual value is a good indication as to whether one or more additional iterations is needed.

In some embodiments, computing updated values of the respective initial value estimates includes (1244), prior to computing the updated values for $\tau_1$, $\tau_2$, $f_c$ and $f_s$, computing an initial updated value for the code tracking timing offset ($\tau_1$) while maintaining the initial values of $\tau_2$, $f_c$ and $f_s$. In some embodiments, computing an initial updated value for the code tracking timing offset ($\tau_1$) prior to solving for the updated values for $\tau_1$, $\tau_2$, $f_c$ and $f_s$, provides a significant improvement which can be used to improve the convergence. There are large non-linear effects in the solution for the time delays. When the initial time delay value of $\tau_1$ has a large error it adversely affects the solution for the values of the other parameters particularly the second time delay $\tau_2$. This can be avoided using a simple solution to first correct the value of $\tau_1$ close to its correct value. Since, we set the initial value of $f_c$ to zero and we assume the correction to that estimate will be small, we can approximate the first I equation from (14) above with:

$$a_1 \Delta\tau_1 + a_5 = 0 \qquad (21)$$

But that means that we can simply solve for the value of $\tau_1$ by solving matrix equation (19) for the value:

$$\Delta\tau_1 = c_{15}/c_{11} \qquad (22)$$

In some embodiments, the update value $\Delta\tau_1$ can be used to update $\tau_1$ and this computation is iterated until it converges. This converged value for $\tau_1$ will be close to the true value and then the entire equation (19) can be solved (iteratively) to obtain the final values of all parameters.

In some embodiments, the method includes determining (1246) a phase error $\phi_\epsilon$ (e.g., $\phi_\epsilon$ 412_1, FIGS. 4A-4F) between the composite signal and the direct-path signal, due to the time delay ($\tau_2$) in the multi-path signal relative to the direct-path signal, in accordance with a trigonometric function defined with respect to the orthogonal representations of the multi-path signal.

In some embodiments, the phase error $\phi_\epsilon$ is determined (1248) using the following equation:

$$\phi_\varepsilon = \sin^{-1}\left(\frac{f_s}{\sqrt{(1-f_c)^2 + f_s^2}}\right) \qquad (23)$$

The method further includes correcting (1250) for the code tracking timing offset ($\tau_1$) and the phase error $\phi_\epsilon$.

In some embodiments, a GNSS system employs one or more distinct ranging codes or encoding schemes—a Precision code (P-code) and a Course/Acquisition Code (C/A-code). Both the P-code and the C/A code employ deterministic pseudorandom noise (PN or PRN) sequences. Each satellite transmits a unique C/A code that is orthogonal to the C/A code transmitted by any other satellite and therefore does not correlate well with the C/A code transmitted by any other satellite. The C/A code is freely available to the public while the P-code is more restricted (e.g., generally restricted to military use). Data is transmitted using the C/A code at 1.023 million chips (or Megabits) per second repeating every millisecond; and for the P code, for U.S. military use, at 10.23 million chips per second repeating once a week. Both C/A code and P code are traditionally used to modulate the L1 carrier, while the L2 carrier is only modulated by the P code.

In some embodiments, respective phases of the P-code and the CA-code are in quadrature. For example, if a similar set of measurements for a first GNSS signal encoded using the P-code and a second GNSS signal encoded using a C/A code are taken in quadrature, the same multipath signal will appear on both signals delayed by the same time delay (e.g., $\tau_2$) relative to the respective direct path signals, but the 90 degree difference in the phase will cause the quadrature Q component of the first signal to be substantially equivalent to the in-phase I component of the second signal and the quadrature Q component of the second signal to be the negative of the in-phase I component of the first signal. The differences in the quadrature I and Q components of the first and second signals are relatively minor and can be handled at the same time or used on a time share basis by alternating between the P-code reconstructed carrier phase and the CA code reconstructed carrier phase. The cosine and sine components of the magnitude of the multi-path signals for the first and second signals are normalized to the same value (e.g., steady state signal magnitude $I_{MAX}$). In some embodiments, the only parameter which will differ between the two phase tracking loops (other than the interchange of sine and cosine components) will be the initial code tracking offset ($\tau_1$).

In some embodiments, the method 1200 is performed (for example, as described with reference to operations 1254-1262) for a composite signal that includes (1252) a first composite signal encoded based on a first encoding scheme (e.g., a P-code) characterized by a first code tracking timing offset ($\tau_1'$). The method includes obtaining respective representations of a second composite signal encoded based on a second encoding scheme (e.g., a C/A-code) characterized by a second code tracking timing offset ($\tau_1''$). In some embodiments, the first composite signal and the second composite signal are characterized by substantially the same measure of the time delay ($\tau_2$) between their respective multi-path signals relative to their respective direct-path signals, substantially the same pair of orthogonal representations of their respective multi-path signals, and substantially the same phase error between the first composite signal or the second composite signal and their respective direct-path signals.

In some embodiments, with respect (1256) to the measurement epoch: obtaining the plurality of coefficients for the set of linear equations comprises obtaining (1258) a plurality of coefficients for the set of linear equations based on the respective representations of the first composite signal and the respective representations of the second composite signal; iteratively obtaining solutions for the set of linear equations comprises solving (1260) for the first code tracking timing offset ($\tau_1'$), the second code tracking timing offset ($\tau_1''$), the time delay ($\tau_2$) between the respective multi-path signals relative to the respective direct-path signals of the first composite signal and the second composite signal, and the pair of orthogonal representations of the respective multi-path signals; and said correcting comprises correcting (1262) for the first code tracking timing offset ($\tau_1$), the second code tracking timing offset ($\tau_1''$), and the phase error $\phi_\epsilon$.

For example, the mathematical formulation for the treatment of the first composite signal with the first encoding scheme (e.g., the P-code) and the second composite signal with the second encoding scheme (e.g., the C/A code) as described with reference to operations 1254-1262 is illustrated below.

Equations (10) and (11) can be modified to apply to the P-code signal measurements by changing only the time delay parameter ($\tau_1$ to $\tau_1'$). The result is:

$$\epsilon_I = \bar{I}'_t - I'_t = \bar{I}'_t - S(\tau''_1) + f_c[S(\tau_1'') - S(\tau_2)] \quad (24\text{-a})$$

$$\epsilon_Q = \bar{Q}'_t - Q'_t = \bar{Q}'_t - f_c[S(\tau''_1) - S(\tau_2)] \quad (25\text{-a})$$

Similarly, equations (10) and (11) can be modified to apply to the C/A-code signal measurements by changing only the time delay parameter ($\tau_1$ to $\tau_1''$). The result is:

$$\epsilon_I = \bar{I}'_t - I'_t = \bar{I}'_t - S(\tau''_1) + f_c[S(\tau''_1) - S(\tau_2)] \quad (24\text{-b})$$

$$\epsilon_Q = \bar{Q}'_t - Q'_t = \bar{Q}'_t - f_s[S(\tau''_1) - S(\tau_2)] \quad (25\text{-b})$$

In equation (24-a) the value of the fractional cosine term in equation (24-b) for the C/A measurements has become the negative of the fractional sine term for the P measurements. In equation (25-a) the value of the fractional sine term $f_s$ in equation (25-b) has become the fractional cosine term $f_c$, in equation (25-a).

Now following the same process used to go from equations (10) and (11) to the matrix equation (19), one can obtain a second matrix equation which can be solved for the parameters which affect the P measurements. But with the exception of the initial tracking points ($\tau'_1$ or $\tau''_1$) the same parameters are involved (and can be placed in the same order). In other words, a combined solution better than either of the stand alone solutions can be generated, for example, using a Gauss elimination of the column matrix elements below the diagonal of the $\Delta\tau'_1$ and $\Delta\tau''_1$ parameters in the two matrix equations. This is illustrated by performing that operation on matrix equation (19). The first step is to divide the first row by its diagonal element, $c_{11}$ to obtain new values given by:

$d_{1j} = c_{1j}/c_{11}$ where j designates the column of the first row. This gives:

$$\begin{pmatrix} 1 & d_{12} & d_{13} & d_{14} & d_{15} \\ c_{21} & c_{22} & c_{23} & c_{24} & c_{25} \\ c_{31} & c_{32} & c_{33} & c_{34} & c_{35} \\ c_{41} & c_{42} & c_{43} & c_{44} & c_{45} \\ c_{51} & c_{52} & c_{53} & c_{54} & c_{55} \end{pmatrix} \begin{pmatrix} \Delta\tau_1 \\ \Delta\tau_2 \\ \Delta f_c \\ \Delta f_s \\ res^2 \end{pmatrix} = \begin{pmatrix} 0 \\ 0 \\ 0 \\ 0 \\ 0 \end{pmatrix} \quad (26)$$

The c matrix elements are relabeled since the process below impacts the diagonal symmetry.

In some embodiments, each of the following rows are modified by taking the first element of each following row, multiplying the first row by it and subtracting the result from each element of the current row. Thus each element in the matrix is obtained by replacing the existing elements as follows where the row is designated by i and the column by j:

$$d_{ij} = c_{ij} - c'_{j1} d_{1j} \quad (27)$$

The prime on the first element term in this equation is to note that it must be saved prior to itself being replaced or alternatively the process of replacement can be ordered such that the first element in the row is processed last for that row of the matrix. When this element replacement process has been completed, equation (26) becomes:

$$\begin{pmatrix} 1 & d_{12} & d_{13} & d_{14} & d_{15} \\ 0 & d_{22} & d_{23} & d_{24} & d_{25} \\ 0 & d_{32} & d_{33} & d_{34} & d_{35} \\ 0 & d_{42} & d_{43} & d_{44} & d_{45} \\ 0 & d_{52} & d_{53} & d_{54} & d_{55} \end{pmatrix} \begin{pmatrix} \Delta\tau_1 \\ \Delta\tau_2 \\ \Delta f_c \\ \Delta f_s \\ res^2 \end{pmatrix} = \begin{pmatrix} 0 \\ 0 \\ 0 \\ 0 \\ 0 \end{pmatrix} \quad (28)$$

This matrix equation (28) will give an analogous result as equation (19) above and can be solved by standard matrix inversion or continued Gauss elimination processes.

In some embodiments, a similar process of taking the equivalent of equation (19) for the P code measurements and C/A code measurements and performing the Gauss elimination of the first column below the first diagonal element results in an equation analogous to equation (28) except that the elements are designated with a prime or double prime and the first parameter (initial code tracking offset) is also designated with a prime or double prime to indicate it is a different parameter. In some embodiments, a matrix formulation is obtained by combining the two solutions for the respective P-code and C/A-code. The combined matrix solution can now be obtained by adding the elements which apply to the same parameters and simply duplicating the rows that are independent.

$$\begin{pmatrix} 1 & 0 & d_{12} & d_{13} & d_{14} & d_{15} \\ 0 & 1 & d'_{12} & d'_{13} & d'_{14} & d'_{15} \\ 0 & 0 & d_{22}+d'_{22} & d_{23}+d'_{23} & d_{24}+d'_{24} & d_{25}+d'_{25} \\ 0 & 0 & d_{32}+d'_{32} & d_{33}+d'_{33} & d_{34}+d'_{34} & d_{35}+d'_{35} \\ 0 & 0 & d_{42}+d'_{42} & d_{43}+d'_{43} & d_{44}+d'_{44} & d_{45}+d'_{45} \\ 0 & 0 & d_{52}+d'_{52} & d_{53}+d'_{53} & d_{54}+d'_{54} & d_{55}+d'_{54} \end{pmatrix} \begin{pmatrix} \Delta\tau'_1 \\ \Delta\tau''_1 \\ \Delta\tau_2 \\ f_c \\ f_s \\ (res)^2 \end{pmatrix} = \begin{pmatrix} 0 \\ 0 \\ 0 \\ 0 \\ 0 \\ 0 \end{pmatrix} \quad (29)$$

In some embodiments, equation (29) provides additional information (e.g., because of the quadrature sensitivity to the multipath components). As a result, this equation yields a better result for the combined solution than either solution alone would give. For example, this formulation of the combined solution suggests a way of evaluating the potential maximum benefit of the nearby multipath rejection approach. The maximum benefit in noise reduction can be measured by simply taking the difference of the quadrature phase measurements and differencing them (after subtracting off the 0.25 cycle difference in tracking point). When one of these measurements suffers maximum phase error due to the multipath, the other suffers minimum distortion in phase error. Thus the root mean square of the difference between the two measurements is a measure of the maximum improvement which could be expected from this nearby multipath removal.

The illustrations and exemplary embodiments of the system and method for mitigating one or more multi-path-induced errors may be used for one or more multi-path signals. If there is more than one multi-path signal present, the estimated parameters will correspond to a vector sum of the multi-path signals. The system and method may also be used for a plurality of receiver or satellite filters if filter characteristics for these filters are known. If the filters have sufficiently similar filter characteristics, in some embodiments a mean filter characteristic may be used to implement the system and method.

While the system and method described above are also useful in mitigating one or more multi-path-induced errors for path-length differences larger than 50 feet, there are some additional challenges associated with such multi-path signals. In particular, such multi-path signals have a shorter correlation time. It those embodiments that use a lower sampling rate and integrate over time to obtain a sufficient signal-to-noise ratio, this may be problematic. In those embodiments, the system and method may be used in conjunction with other multi-path-induced error mitigation techniques, such as a double-delta correction, a strobed correlator and a pulse-aperture correlator. The double-delta correction technique, and other multi-path-induced error mitigation techniques, are well suited for use in conjunction with this system and method. In particular, the system and method described above mitigate phase errors associated with multi-path signals that are not removed by these other multi-path-induced error mitigation techniques and also estimate the residual multi-path induced pseudo-range errors. In addition, these other multi-path-induced error mitigation techniques and the system and method described above do not interfere with one another.

The system and method for mitigating phase errors associated with short-range multi-path signals may be implemented in a number of configurations. The dividing line between analog processing, digital hardware and software signal processing is arbitrary, and varies greatly from receiver to receiver. Often a large portion of the signal processing in receivers is implemented in an ASIC. Other configurations use a combination of an ASIC and software executed by one or more processors. The trend has been to implement more and more of the receiver in software. Some receivers, including those that are non-real time, have been implemented entirely in software. In addition, some receivers have implemented all the signal processing with analog circuitry.

In some embodiments of the system, steps performed on a time scale of 33 ns (30 MHz) or less are implemented using analog circuitry. Steps performed on time scales between 33 ns and 1 ms are implemented using an ASIC. Remaining steps, such as integrations in accumulators, on longer time scales are implemented using software executed by one or more processors, such as a microprocessor.

Figure 11:
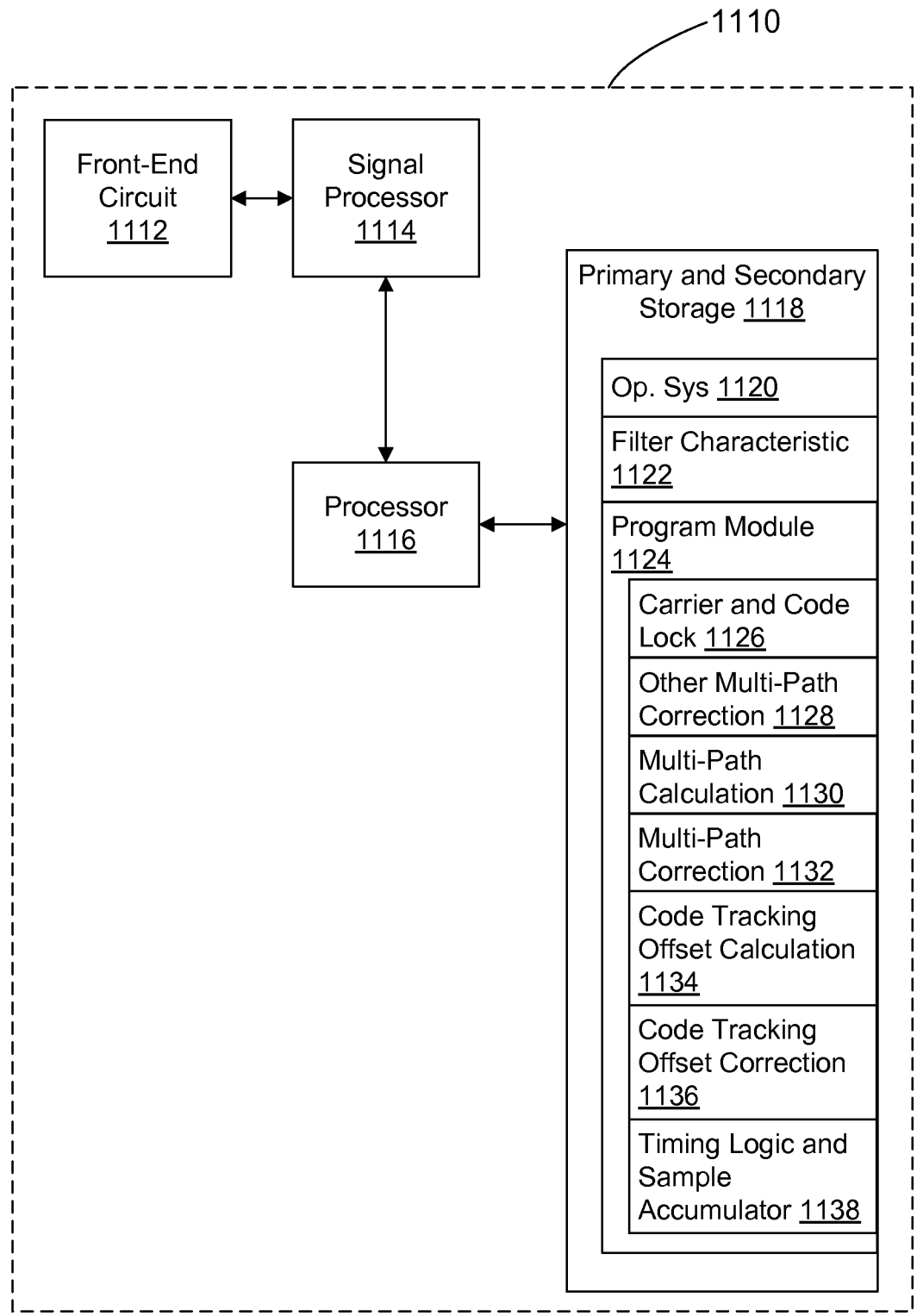
FIG. 11 is a block diagram illustrating the components of the typical device for use in the global navigation satellite system (GNSS), in accordance with some embodiments.
Figure 12A:
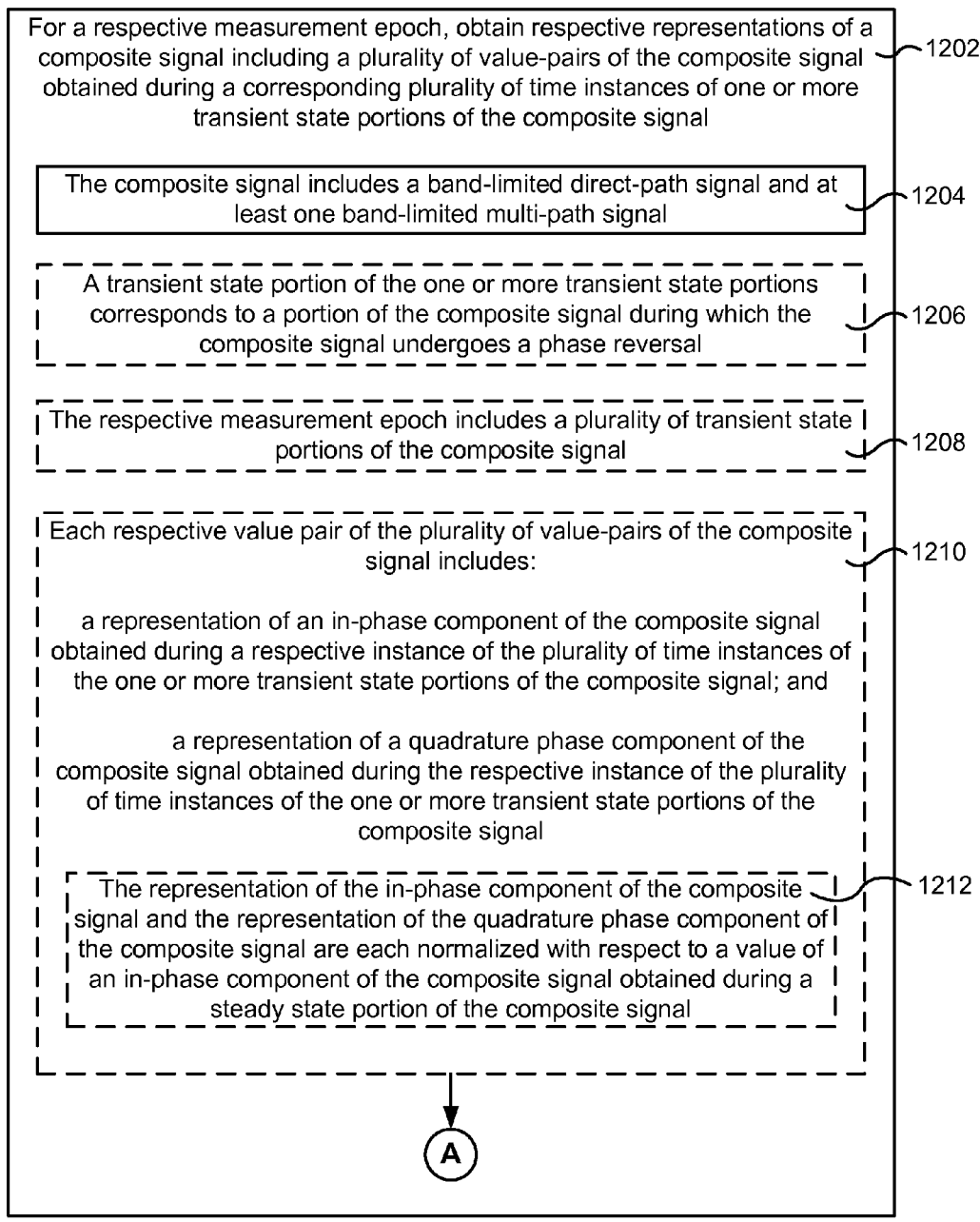
FIGS. 12A-12F include a flowchart illustrating a method for determining and mitigating the effect of a multi-path-induced error in a global navigation satellite system (GNSS), in accordance with some embodiments.
Figure 12B:
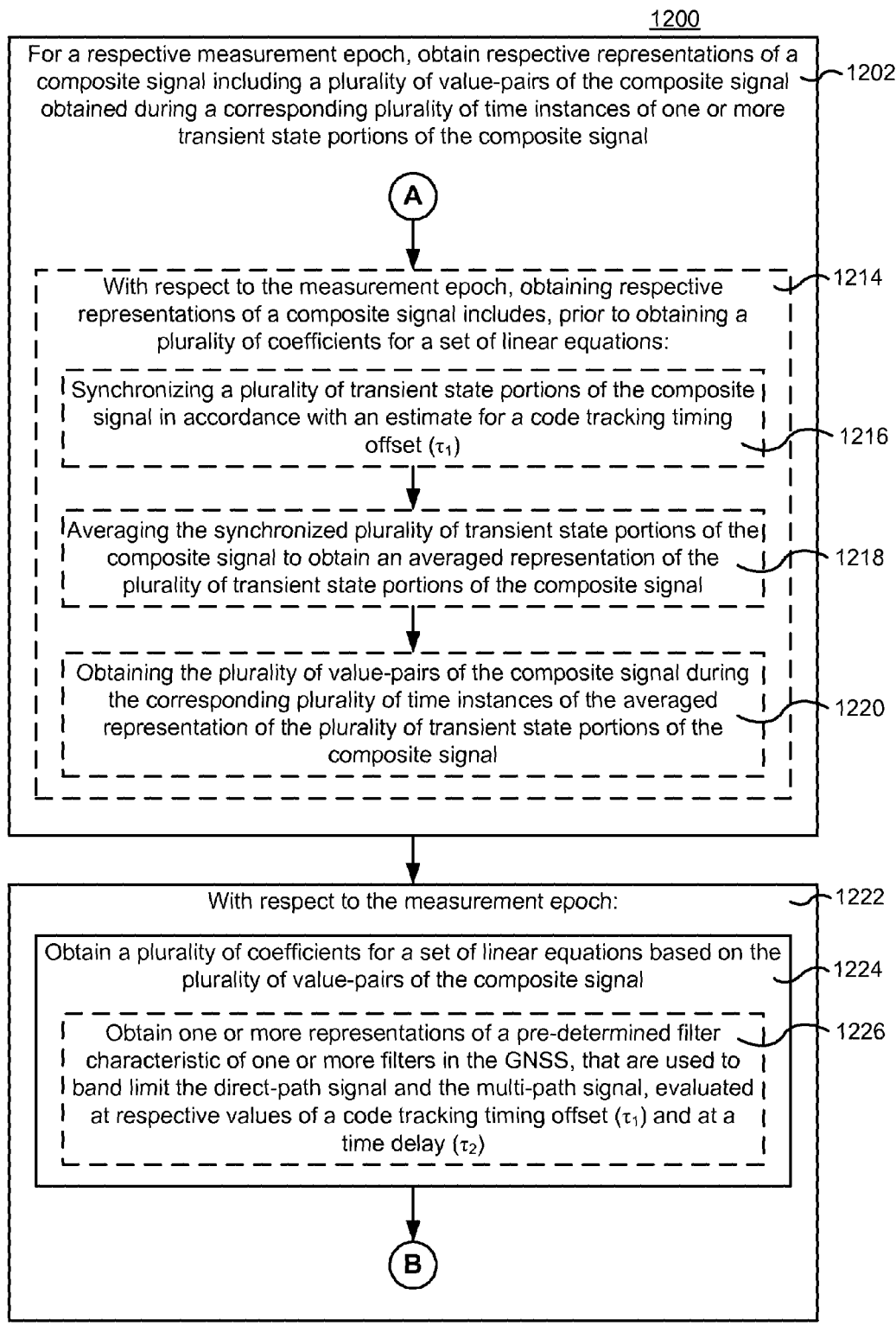
Figure 12C:
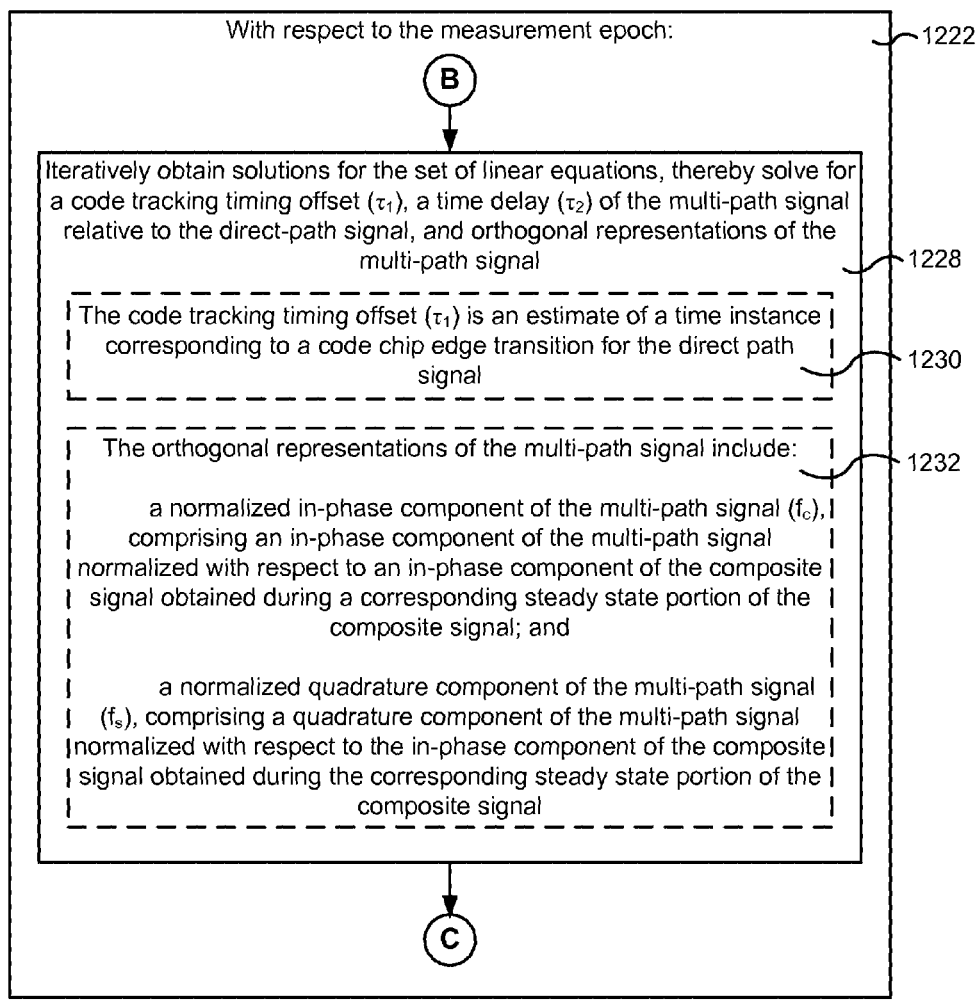
Figure 12D:
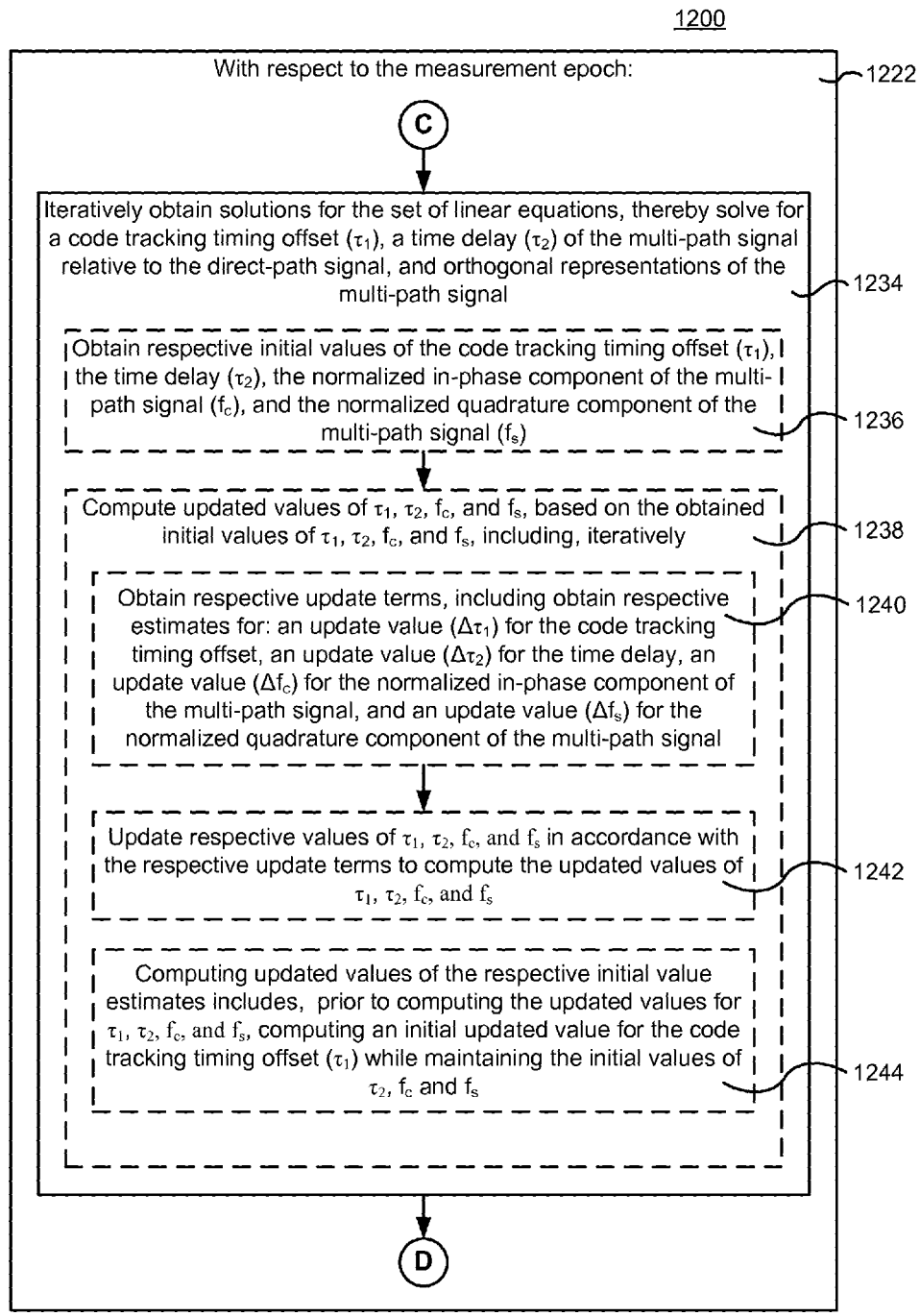
Figure 12E:
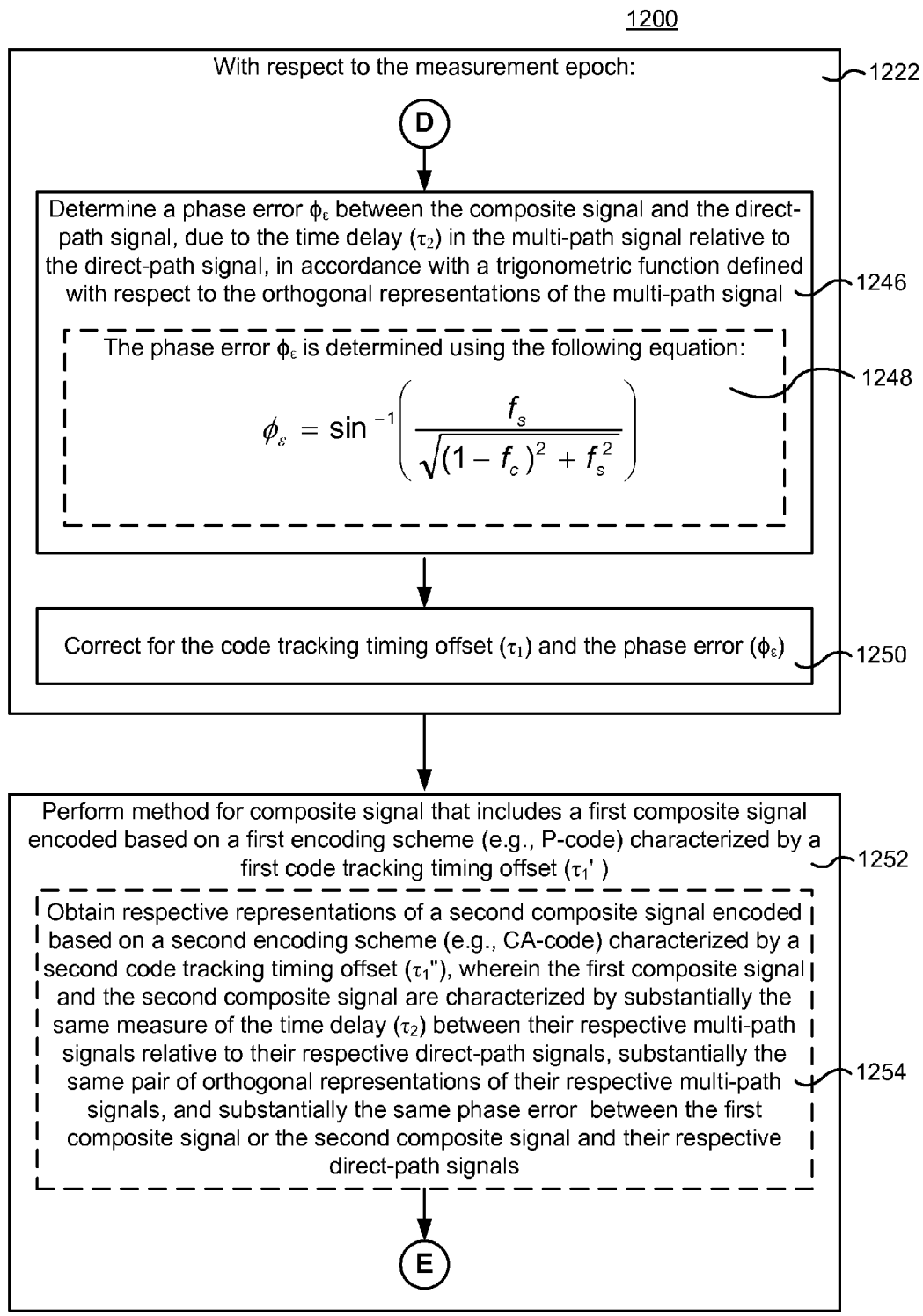
Figure 12F:
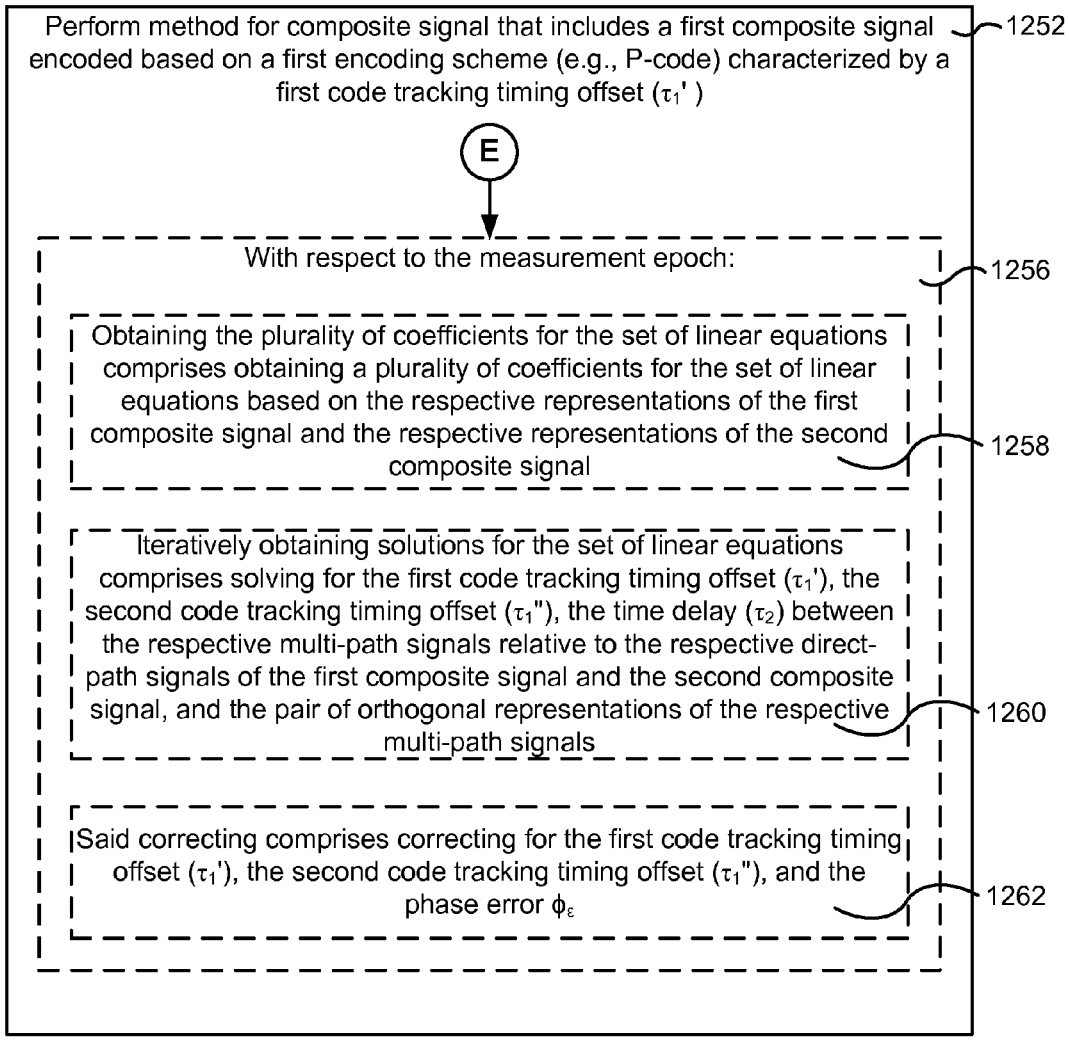

FIG. 11 illustrates an embodiment of a device 1110 in the global navigation satellite system (GNSS) for mitigating one or more multi-path-induced errors. The device 1110 includes:

a front-end circuit 1112, such as front-end circuit 800 (FIG. 8);

a signal processor 1114, such as signal processor 900 (FIG. 9);

processor 1116;

storage 1118, which may include high-speed random access memory and may also include non-volatile memory, such as one or more magnetic disk storage devices, EEPROM and/or Flash EEPROM, the storage further including:

an operating system 1120;

one or more filter characteristics 1122; and and at least one program module 1124, executed by processor 1116, the at least one program module 1124 including instructions for carrier and code lock 1126, an optional other multi-path correction 1128 module (such as the double-delta correction, the strobed correlator and the pulse-aperture correlator), a multi-path calculation module 1130 that implements method 1200 described previously, a multi-path correction module 1132 for correction of the phase error $\phi_\epsilon$ 412_1 (FIG. 4A) or the pseudo-range, Code Tracking Offset Calculation module 1134, Code Tracking Offset Correction module 1136, and Timing Logic and Sample Accumulator 1138.

In some embodiments there may be more than one processor 1116. As noted previously, in other embodiments, the device 1110 may include an ASIC and some or all of the functionality of the at least one program module 1124, executed by the processor 1116, may be implemented in the ASIC.

The foregoing description, for purposes of explanation, used specific nomenclature to provide a thorough understanding of the invention. However, it will be apparent to one skilled in the art that the specific details are not required in order to practice various embodiments. The embodiments discussed above were chosen and described in order to best explain principles of operation and practical applications. Thus, the foregoing disclosure is not intended to be exhaustive or to limit the claims to the precise forms disclosed. Many modifications and variations are possible in view of the above teachings.

What is claimed:

1. A method, performed by a device, of mitigating the effect of a multi-path-induced error in a global navigation satellite system (GNSS), comprising:
   for a respective measurement epoch, obtaining respective representations of a composite signal including a plurality of value-pairs of the composite signal obtained during a corresponding plurality of time instances of one or more transient state portions of the composite signal, wherein the composite signal includes a band-limited direct-path signal and at least one band-limited multi-path signal;
   with respect to the measurement epoch:
      obtaining a plurality of coefficients for a set of linear equations based on the plurality of value-pairs of the composite signal;
      iteratively obtaining solutions for the set of linear equations, thereby solving for a code tracking timing offset ($\tau_1$), a time delay ($\tau_2$) of the multi-path signal relative to the direct-path signal, and orthogonal representations of the multi-path signal;
      determining a phase error $\phi_\epsilon$ between the composite signal and the direct-path signal, due to the time delay ($\tau_2$) in the multi-path signal relative to the direct-path signal, in accordance with a trigonometric function defined with respect to the orthogonal representations of the multi-path signal; and
      correcting for the code tracking timing offset ($\tau_1$) and the phase error $\Phi_\epsilon$.

2. The method of claim 1, wherein:
   a transient state portion of the one or more transient state portions corresponds to a portion of the composite signal during which the composite signal undergoes a phase reversal; and
   the respective measurement epoch includes a plurality of transient state portions of the composite signal.

3. The method of claim 1, wherein each respective value pair of the plurality of value-pairs of the composite signal includes:
   a representation of an in-phase component of the composite signal obtained during a respective instance of the plurality of time instances of the one or more transient state portions of the composite signal; and
   a representation of a quadrature phase component of the composite signal obtained during the respective instance of the plurality of time instances of the one or more transient state portions of the composite signal.

4. The method of claim 3, wherein the representation of the in-phase component of the composite signal and the representation of the quadrature phase component of the composite signal are each normalized with respect to a value of an in-phase component of the composite signal obtained during a steady state portion of the composite signal.

5. The method of claim 1, wherein, with respect to the measurement epoch, obtaining respective representations of a composite signal includes, prior to obtaining the plurality of coefficients for the set of linear equations:
   synchronizing a plurality of transient state portions of the composite signal in accordance with an estimate for the code tracking timing offset ($\tau_1$);
   averaging the synchronized plurality of transient state portions of the composite signal to obtain an averaged representation of the plurality of transient state portions of the composite signal; and
   obtaining the plurality of value-pairs of the composite signal during the corresponding plurality of time instances of the averaged representation of the plurality of transient state portions of the composite signal.

6. The method of claim 1, wherein obtaining a plurality of coefficients for a set of linear equations includes obtaining one or more representations of a pre-determined filter characteristic of one or more filters in the GNSS, that are used to band limit the direct-path signal and the multi-path signal, evaluated at respective values of the code tracking timing offset ($\tau_1$) and at the time delay ($\tau_2$).

7. The method of claim 1, wherein:
   the code tracking timing offset ($\tau_1$) is an estimate of a time instance corresponding to a code chip edge transition for the direct path signal; and
   the orthogonal representations of the multi-path signal include:
      a normalized in-phase component of the multi-path signal ($f_c$), comprising an in-phase component of the multi-path signal normalized with respect to an in-phase component of the composite signal obtained during a corresponding steady state portion of the composite signal; and
      a normalized quadrature component of the multi-path signal ($f_s$), comprising a quadrature component of the multi-path signal normalized with respect to the in-phase component of the composite signal obtained during the corresponding steady state portion of the composite signal.

8. The method of claim 7, wherein iteratively obtaining solutions for the set of linear equations comprises:
   obtaining respective initial values of the code tracking timing offset ($\tau_1$), the time delay ($\tau_2$), the normalized in-phase component of the multi-path signal ($f_c$), and the normalized quadrature component of the multi-path signal ($f_s$); and
   computing updated values of $\tau_1$, $T_2$, $f_c$, and $f_s$, based on the obtained initial values of $\tau_1$, $\tau_2$, $f_c$, and $f_s$, including, iteratively:
      obtaining respective update terms, including obtaining respective estimates for: an update value ($\Delta\tau_1$) for the code tracking timing offset, an update value ($\Delta\tau_2$) for the time delay, an update value ($\Delta f_c$) for the normalized in-phase component of the multi-path signal, and an update value ($\Delta f_s$) for the normalized quadrature component of the multi-path signal; and updating respective values of $\tau_1$, $\tau_2$, $f_c$, and $f_s$ in accordance with the respective update terms to compute the updated values of $\tau_1$, $\tau_2$, $f_c$, and $f_s$.

9. The method of claim 8, wherein computing updated values of the respective initial value estimates includes, prior to computing the updated values for $\tau_1$, $\tau_2$, $f_c$ and $f_s$, computing an initial updated value for the code tracking timing offset ($\tau_1$) while maintaining the initial values of $\tau_2$, $f_c$ and $f_s$.

10. The method of claim 7, wherein the phase error $\phi_\epsilon$ is determined using the following equation:

$$\phi_c = \sin^{-1}\left(\frac{f_s}{\sqrt{(1-f_c)^2 + f_s^2}}\right)$$

11. The method of claim 1, wherein:
the composite signal comprises a first composite signal encoded based on a first encoding scheme characterized by a first code tracking timing offset ($\tau_1'$);
the method further comprises, for the respective measurement epoch, obtaining respective representations of a second composite signal encoded based on a second encoding scheme characterized by a second code tracking timing offset ($\tau_1''$), wherein the first composite signal and the second composite signal are characterized by substantially the same measure of the time delay ($\tau_2$) between their respective multi-path signals relative to their respective direct-path signals, substantially the same pair of orthogonal representations of their respective multi-path signals, and substantially the same phase error $\phi_\epsilon$ between the first composite signal or the second composite signal and their respective direct-path signals; and
with respect to the measurement epoch:
obtaining the plurality of coefficients for the set of linear equations comprises obtaining a plurality of coefficients for the set of linear equations based on the respective representations of the first composite signal and the respective representations of the second composite signal;
iteratively obtaining solutions for the set of linear equations comprises solving for the first code tracking timing offset ($\tau_1'$), the second code tracking timing offset ($\tau_1''$), the time delay ($\tau_2$) between the respective multi-path signals relative to the respective direct-path signals of the first composite signal and the second composite signal, and the pair of orthogonal representations of the respective multi-path signals; and
said correcting comprises correcting for the first code tracking timing offset ($\tau_1'$), the second code tracking timing offset ($\tau_1''$), and the phase error $\phi_\epsilon$.

12. A device that mitigates the effect of a multi-path-induced error in a global navigation satellite system (GNSS), comprising:
a receiver for obtaining, for a respective measurement epoch, respective representations of a composite signal a plurality of value-pairs of the composite signal obtained during a corresponding plurality of time instances of one or more transient state portions of the composite signal, wherein the composite signal includes a band-limited direct-path signal and at least one band-limited multi-path signal;
one or more processors;
memory; and
one or more programs, wherein the one or more programs are stored in the memory and configured to be executed by the one or more processors, the one or more programs including instructions for:
with respect to the measurement epoch:
obtaining a plurality of coefficients for a set of linear equations based on the plurality of value-pairs of the composite signal;
iteratively obtaining solutions for the set of linear equations, thereby solving for a code tracking timing offset ($\tau_1$), a time delay ($\tau_2$) of the multi-path signal relative to the direct-path signal, and orthogonal representations of the multi-path signal;
determining a phase error $\phi_\epsilon$ between the composite signal and the direct-path signal, due to the time delay ($\tau_2$) in the multi-path signal relative to the direct-path signal, in accordance with a trigonometric function defined with respect to the orthogonal representations of the multi-path signal; and
correcting for the code tracking timing offset ($\tau_1$) and the phase error $\phi_\epsilon$.

13. The device of claim 12, wherein:
a transient state portion of the one or more transient state portions corresponds to a portion of the composite signal during which the composite signal undergoes a phase reversal; and
the respective measurement epoch includes a plurality of transient state portions of the composite signal.

14. The device of claim 12, wherein each respective value pair of the plurality of value-pairs of the composite signal includes:
a representation of an in-phase component of the composite signal obtained during a respective instance of the plurality of time instances of the one or more transient state portions of the composite signal; and
a representation of a quadrature phase component of the composite signal obtained during the respective instance of the plurality of time instances of the one or more transient state portions of the composite signal.

15. The device of claim 14, wherein the representation of the in-phase component of the composite signal and the representation of the quadrature phase component of the composite signal are each normalized with respect to a value of an in-phase component of the composite signal obtained during a steady state portion of the composite signal.

16. The device of claim 12, wherein, the instructions for obtaining respective representations of a composite signal include instructions for:
synchronizing a plurality of transient state portions of the composite signal in accordance with an estimate for the code tracking timing offset ($\tau_1$);
averaging the synchronized plurality of transient state portions of the composite signal to obtain an averaged representation of the plurality of transient state portions of the composite signal; and
obtaining the plurality of value-pairs of the composite signal during the corresponding plurality of time instances of the averaged representation of the plurality of transient state portions of the composite signal.

17. The device of claim 12, wherein the instructions for obtaining a plurality of coefficients for a set of linear equations include instructions for obtaining one or more representations of a pre-determined filter characteristic of one or more filters in the GNSS, that are used to band limit the direct-path signal and the multi-path signal, evaluated at respective values of the code tracking timing offset ($\tau_1$) and at the time delay ($\tau_2$).

18. A non-transitory computer readable storage medium storing one or more programs, the one or more programs comprising instructions, which when executed by a device that mitigates the effect of a multi-path-induced error in a global navigation satellite system (GNSS), the device including one or more processors, cause the device to:

for a respective measurement epoch, obtain respective representations of a composite signal a plurality of value-pairs of the composite signal obtained during a corresponding plurality of time instances of one or more transient state portions of the composite signal, wherein the composite signal includes a band-limited direct-path signal and at least one band-limited multi-path signal;

with respect to the measurement epoch:
  obtain a plurality of coefficients for a set of linear equations based on the plurality of value-pairs of the composite signal;
  iteratively obtain solutions for the set of linear equations, thereby solve for a code tracking timing offset ($\tau_1$), a time delay ($\tau_2$) of the multi-path signal relative to the direct-path signal, and orthogonal representations of the multi-path signal;
  determine a phase error $\phi_\epsilon$ between the composite signal and the direct-path signal, due to the time delay ($\tau_2$) in the multi-path signal relative to the direct-path signal, in accordance with a trigonometric function defined with respect to the orthogonal representations of the multi-path signal; and
  correct for the code tracking timing offset ($\tau_1$) and the phase error $\phi_\epsilon$.

19. The non-transitory computer readable storage medium of claim 18, wherein:
a transient state portion of the one or more transient state portions corresponds to a portion of the composite signal during which the composite signal undergoes a phase reversal; and
the respective measurement epoch includes a plurality of transient state portions of the composite signal.

20. The non-transitory computer readable storage medium of claim 18, wherein each respective value pair of the plurality of value-pairs of the composite signal includes:

a representation of an in-phase component of the composite signal obtained during a respective instance of the plurality of time instances of the one or more transient state portions of the composite signal; and a representation of a quadrature phase component of the composite signal obtained during the respective instance of the plurality of time instances of the one or more transient state portions of the composite signal.

21. The non-transitory computer readable storage medium of claim 20, wherein the representation of the in-phase component of the composite signal and the representation of the quadrature phase component of the composite signal are each normalized with respect to a value of an in-phase component of the composite signal obtained during a steady state portion of the composite signal.

22. The non-transitory computer readable storage medium of claim 18, wherein, the instructions for obtaining respective representations of a composite signal include instructions for:

synchronizing a plurality of transient state portions of the composite signal in accordance with an estimate for the code tracking timing offset ($\tau_1$);

averaging the synchronized plurality of transient state portions of the composite signal to obtain an averaged representation of the plurality of transient state portions of the composite signal; and obtaining the plurality of value-pairs of the composite signal during the corresponding plurality of time instances of the averaged representation of the plurality of transient state portions of the composite signal.

23. The non-transitory computer readable storage medium of claim 18, wherein the instructions for obtaining a plurality of coefficients for a set of linear equations include instructions for obtaining one or more representations of a predetermined filter characteristic of one or more filters in the GNSS, that are used to band limit the direct-path signal and the multi-path signal, evaluated at respective values of the code tracking timing offset ($\tau_1$) and at the time delay ($\tau_2$).

* * * * *